United States Patent
Hardy

(10) Patent No.: US 11,720,393 B2
(45) Date of Patent: *Aug. 8, 2023

(54) ENFORCING COMPLIANCE RULES USING GUEST MANAGEMENT COMPONENTS

(71) Applicant: AirWatch LLC, Atlanta, GA (US)

(72) Inventor: Adam Michael Hardy, Alpharetta, GA (US)

(73) Assignee: AIRWATCH LLC, Atlanta, GA (US)

( * ) Notice: Subject to any disclaimer, the term of this patent is extended or adjusted under 35 U.S.C. 154(b) by 48 days.

This patent is subject to a terminal disclaimer.

(21) Appl. No.: 17/383,528

(22) Filed: Jul. 23, 2021

(65) Prior Publication Data

US 2021/0349750 A1  Nov. 11, 2021

Related U.S. Application Data

(63) Continuation of application No. 15/961,077, filed on Apr. 24, 2018, now Pat. No. 11,093,271, which is a (Continued)

(51) Int. Cl.
*G06F 9/455* (2018.01)
*G06F 21/57* (2013.01)
*G06F 21/60* (2013.01)

(52) U.S. Cl.
CPC ........ *G06F 9/45558* (2013.01); *G06F 21/577* (2013.01); *G06F 21/60* (2013.01); (Continued)

(58) Field of Classification Search
CPC .... G06F 9/45558; G06F 21/577; G06F 21/60; G06F 2009/45591
See application file for complete search history.

(56) References Cited

U.S. PATENT DOCUMENTS 7,865,893 B1 * 1/2011 Omelyanchuk ..... G06F 9/45545
718/1
8,918,859 B2 12/2014 Hilgenkamp
(Continued)

FOREIGN PATENT DOCUMENTS

EP   2648370 A1   10/2013
GB   2483300 A    3/2012

OTHER PUBLICATIONS

Burton, David P; et al. "Simulated, Emulated, and Physical Investigative Analysis (SPIA) of Networked Systems" No. SAND2009-5996. Sandia National Laboratories (SNL), Albuquerque, NM, and Livermore, CA (United States), 2009.

*Primary Examiner* — Benjamin C Wu
(74) *Attorney, Agent, or Firm* — Thomas Horstemeyer, LLP

(57) ABSTRACT

A system can include a host device that includes a host management component and a virtual machine execution environment with a guest management component. The guest management component receives a data object generated by the host component. The data object specifies host parameters detected for the host device and hypervisor parameters detected for the hypervisor component. The hypervisor component relays the data object from the host management component to the guest management component, which identifies a violation of a compliance rule using this information. The guest management component performs an action based on the violation.

20 Claims, 11 Drawing Sheets

Related U.S. Application Data continuation of application No. 15/074,035, filed on Mar. 18, 2016, now Pat. No. 9,990,222.

(52) U.S. Cl.
CPC .............. *G06F 2009/45587* (2013.01); *G06F 2009/45591* (2013.01); *G06F 2221/034* (2013.01)

(56) References Cited

U.S. PATENT DOCUMENTS

| | | | |
|---|---|---|---|
| 9,087,001 | B1 | 7/2015 | Christensen et al. |
| 9,521,117 | B2 | 12/2016 | Barton et al. |
| 9,641,385 | B1 | 5/2017 | Daniel et al. |
| 9,697,025 | B2 * | 7/2017 | De Santis ............ G06F 9/45533 |
| 9,733,959 | B2 * | 8/2017 | Hu ....................... G06F 9/45533 |
| 9,990,222 | B2 * | 6/2018 | Hardy .................... G06F 21/60 |
| 10,033,766 | B2 | 7/2018 | Gupta et al. |
| 10,104,053 | B2 | 10/2018 | Wipfel et al. |
| 2004/0268142 | A1 | 12/2004 | Karjala et al. |
| 2007/0171921 | A1 * | 7/2007 | Wookey .................. H04L 63/10 707/E17.013 |
| 2007/0186212 | A1 | 8/2007 | Mazzaferri et al. |
| 2008/0134176 | A1 * | 6/2008 | Fitzgerald ........... G06F 9/45558 718/1 |
| 2008/0196043 | A1 | 8/2008 | Feinleib et al. |
| 2009/0234953 | A1 | 9/2009 | Braslavsky |
| 2010/0017512 | A1 | 1/2010 | Ciano et al. |
| 2010/0027552 | A1 | 2/2010 | Hill |
| 2010/0058432 | A1 * | 3/2010 | Neystadt ................. G06F 21/57 726/1 |
| 2010/0070970 | A1 * | 3/2010 | Hu ....................... G06F 9/45533 718/1 |
| 2011/0085563 | A1 | 4/2011 | Kotha et al. |
| 2011/0173353 | A1 | 7/2011 | Bauman et al. |
| 2011/0252240 | A1 | 10/2011 | Freedman et al. |
| 2012/0311574 | A1 * | 12/2012 | Song ................... G06F 11/3093 718/1 |
| 2013/0055242 | A1 | 2/2013 | Tsirkin et al. |
| 2013/0219156 | A1 | 8/2013 | Sears |
| 2013/0250951 | A1 | 9/2013 | Koganti |
| 2013/0275966 | A1 | 10/2013 | Harper et al. |
| 2013/0297769 | A1 | 11/2013 | Chang et al. |
| 2013/0332923 | A1 | 12/2013 | Shaposhnik et al. |
| 2014/0059544 | A1 | 2/2014 | Koganty et al. |
| 2014/0096134 | A1 | 4/2014 | Barak et al. |
| 2014/0229686 | A1 | 8/2014 | Tsirkin |
| 2014/0269705 | A1 | 9/2014 | Decusatis et al. |
| 2015/0023146 | A1 | 1/2015 | Suzuki |
| 2015/0058459 | A1 | 2/2015 | Amendjian et al. |
| 2015/0058844 | A1 | 2/2015 | Conklin et al. |
| 2015/0120931 | A1 | 4/2015 | Padala et al. |
| 2015/0180715 | A1 | 6/2015 | Ozawa et al. |
| 2015/0244566 | A1 | 8/2015 | Puimedon |
| 2015/0263887 | A1 | 9/2015 | Sajeepa et al. |
| 2015/0363216 | A1 | 12/2015 | Sampathkumar et al. |
| 2015/0363221 | A1 | 12/2015 | Terayama et al. |
| 2015/0378760 | A1 | 12/2015 | Su et al. |
| 2015/0381494 | A1 | 12/2015 | Cherian et al. |
| 2016/0156591 | A1 | 6/2016 | Zhou et al. |
| 2016/0253194 | A1 | 9/2016 | Kolesnik et al. |
| 2016/0335106 | A1 | 11/2016 | Behere et al. |
| 2016/0337206 | A1 | 11/2016 | Bugenhagen et al. |
| 2016/0359908 | A1 | 12/2016 | Lam |
| 2016/0371135 | A1 | 12/2016 | Sarkar et al. |
| 2016/0378529 | A1 | 12/2016 | Wen |
| 2017/0034129 | A1 | 2/2017 | Sawant et al. |
| 2017/0097838 | A1 | 4/2017 | Nagapudi et al. |
| 2017/0099188 | A1 | 4/2017 | Chang et al. |
| 2017/0109183 | A1 | 4/2017 | Cropper et al. |
| 2017/0154189 | A1 * | 6/2017 | Betzler ............... G06F 9/45558 |
| 2017/0171197 | A1 | 6/2017 | Alexander et al. |
| 2017/0272359 | A1 | 9/2017 | Behringer et al. |
| 2017/0300309 | A1 * | 10/2017 | Berger .................... H04L 67/34 |
| 2018/0210750 | A1 | 7/2018 | Cui et al. |

\* cited by examiner

ENFORCING COMPLIANCE RULES USING GUEST MANAGEMENT COMPONENTS

CROSS-REFERENCE TO RELATED APPLICATIONS

This application claims priority to each of the following as a continuation of co-pending U.S. Patent Application entitled "ENFORCING COMPLIANCE RULES USING HOST MANAGEMENT COMPONENT," filed on Apr. 24, 2018, and assigned application Ser. No. 15/961,077, which is a continuation of "ENFORCING COMPLIANCE RULES AGAINST HYPERVISOR AND VIRTUAL MACHINE USING HOST MANAGEMENT COMPONENT," filed on Mar. 18, 2016, and assigned application Ser. No. 15/074,035, all which are incorporated herein by reference in their entireties.

BACKGROUND

Some companies provide their employees with computing devices that are dedicated for work purposes. These companies often impose restrictions on the usage of the devices. For example, some companies instruct their employees to refrain from using their work devices for personal activities.

Some companies implement "bring your own device" (BYOD) policies in which employees are allowed to bring their personal devices to work and to use their personal devices for work purposes. For instance, these companies may allow their employees to use their personal laptops to access their companies' internal networks, email servers, and work files.

However, if the security of an employee's personal device is compromised, the compromised device can subject a company to an increased security risk. For example, if an employee's operating system is not updated with the latest security patches, a malicious user can exploit security vulnerabilities in the compromised device to gain access to the company's resources through the user's compromised device.

BRIEF DESCRIPTION OF THE DRAWINGS

Many aspects of the present disclosure can be better understood with reference to the following drawings. The components in the drawings are not necessarily to scale, with emphasis instead being placed upon clearly illustrating the principles of the disclosure. Moreover, in the drawings, like reference numerals designate corresponding parts throughout the several views.

DETAILED DESCRIPTION

The present disclosure relates to the management of computing devices that can include virtual machines. In one example, a host computing device can include a host management component and a guest management component. The host management component can monitor conditions associated with the host device. The guest management component can monitor conditions associated with a virtual machine in the host device.

The host management component and the guest management component can determine whether the host device, the virtual machine, or a hypervisor for the virtual machine violate various compliance rules. If the host device, the virtual machine, or the hypervisor violate a compliance rule, the host management component and the guest management component can perform various remedial actions. For example, the host management component can modify a condition of the host device, the virtual machine, or the hypervisor. Similarly, the guest management component can modify a condition of the host device, the virtual machine, or the hypervisor in the event of that a component violates a compliance rule.

Thus, both the host management component and the guest management component can enforce compliance rules. As a result, the host management component and the guest management component can improve the functioning of computer systems and networks by increasing the security of the host device along with enterprise devices to which the host device can communicate. In the following discussion, examples of systems and their components are described, followed by examples of the operation of those systems.

Figure 1:
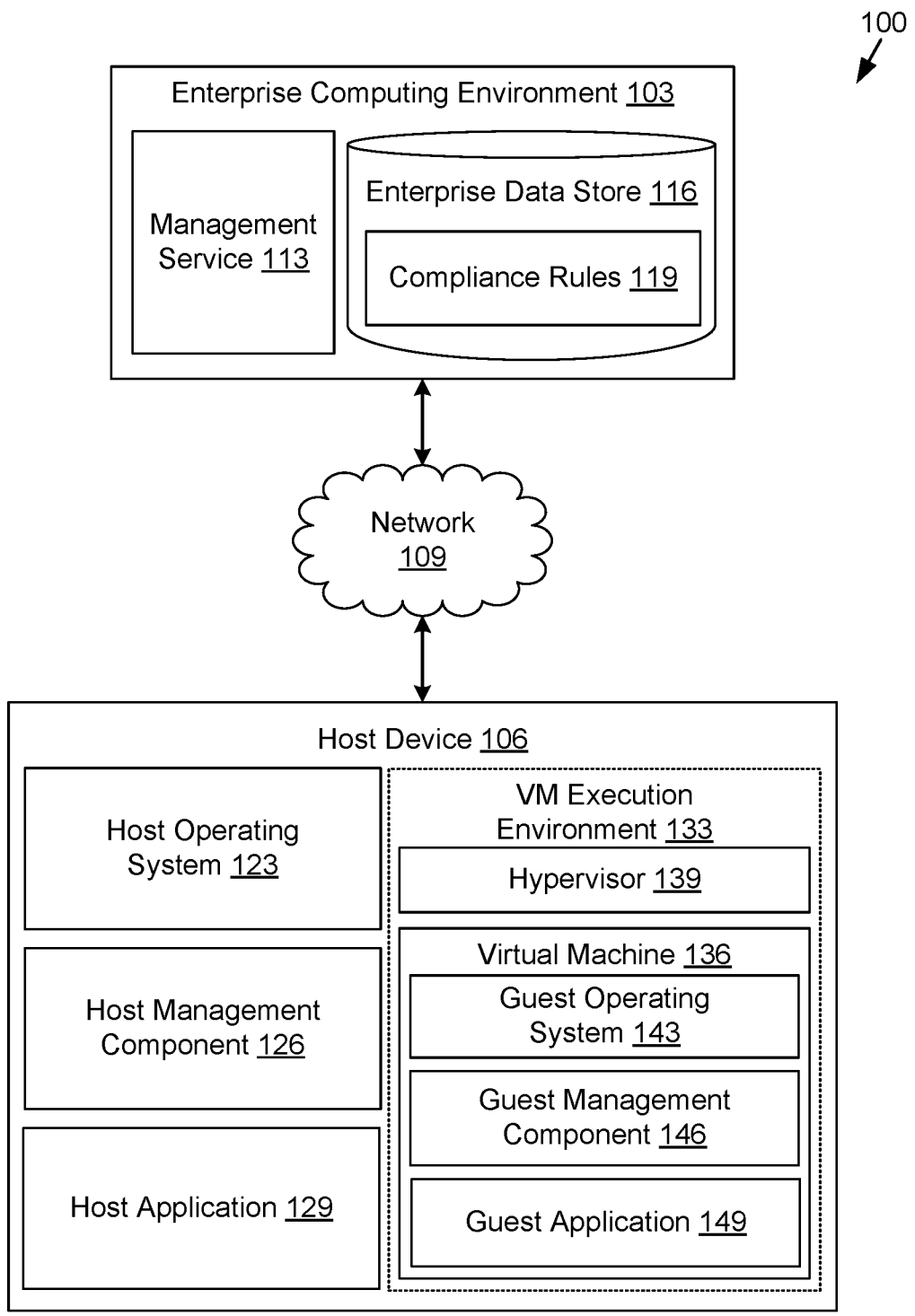
FIG. 1 is a drawing of an example of a networked environment.

With reference to FIG. 1, shown is an example of a networked environment 100. The networked environment 100 can include an enterprise computing environment 103 and a host device 106 in data communication through a network 109. The network 109 can include the Internet, one or more intranets, extranets, wide area networks (WANs), local area networks (LANs), wired networks, wireless networks, or any combination of two or more such networks. The network 109 can include satellite networks, cable networks, Ethernet networks, cellular networks, and telephony networks.

The enterprise computing environment 103 can be a computing system operated by one or more enterprises, such as a business or other organization. The enterprise computing environment 103 can include a computing device, such as a server computer, that can provide computing capabilities. Alternatively, the enterprise computing environment 103 can include multiple computing devices arranged in one or more server banks or computer banks. For examples in which the enterprise computing environment 103 includes multiple computing devices, the computing devices can be located in a single installation, or the computing devices can be distributed among multiple different geographical locations.

In some examples, the enterprise computing environment 103 can include computing devices that together form a hosted computing resource or a grid computing resource. In other examples, the enterprise computing environment 103 can operate as an elastic computing resource for which the allotted capacity of computing-related resources, such as processing resources, network resources, and storage resources, can vary over time. In other examples, the enterprise computing environment 103 can include or be operated as one or more virtualized computer instances that can be executed in order to perform the functionality that is described herein.

The enterprise computing environment 103 can include various systems. For example, the enterprise computing environment 103 can include a management service 113 that can monitor and manage the operation of host devices 106 associated with the enterprise that operates the enterprise computing environment 103. In some examples, the management service 113 can manage and oversee the operation of multiple host devices 106 enrolled in a mobile device management service that is provided by the management service 113. The management service 113 can also provide the host devices 106 with access to email, calendar data, contact information, and other resources associated with the enterprise.

The enterprise computing environment 103 can also include an enterprise data store 116. The enterprise data store 116 can be representative of multiple enterprise data stores 116 accessible by components in the networked environment 100. The enterprise data store 116 can store various data associated with the enterprise computing environment 103. For example, the enterprise data store 116 can store compliance rules 119.

The management service 113 can assign various compliance rules 119 to respective host devices 106. The compliance rules 119 can specify, for example, one or more conditions that must be satisfied for a component to be deemed compliant with the compliance rule 119. As will be described in further detail below, components in the enterprise computing environment 103, the host device 106, or both the enterprise computing environment 103 and the host device 106 can determine whether a compliance rule 119 is satisfied.

In one example, a compliance rule 119 can specify that particular applications are prohibited from being installed in the host device 106 or in a virtual machine in the host device 106. As another example, a compliance rule 119 can specify that the host device 106 or a virtual machine in the host device 106 must be located in a secured location, such as the premises of the enterprise that operates the enterprise computing environment 103, in order for the host device 106 or the virtual machine to be authorized to access or render content.

Various compliance rules 119 can be based on time, geographical location, or device and network properties. For instance, the host device 106 or a virtual machine can satisfy a compliance rule 119 when the host device 106 or the virtual machine is located within a particular geographic location. The host device 106 or a virtual machine can satisfy a compliance rule 119 in other examples when the host device 106 or the virtual is in communication with a particular local area network (LAN), such as a particular LAN that is managed by the enterprise computing environment 103. Furthermore, a compliance rule 119 in another example can be satisfied upon the time and date matching specified values.

Another example of a compliance rule 119 involves whether a user belongs to a particular user group. For instance, a compliance rule 119 can include a whitelist or a blacklist that specifies whether particular users or groups of users are authorized to perform various functionality, such as installing or executing a particular application.

In some examples, an enterprise can operate the management service 113 to ensure that the host devices 106, virtual machines, and hypervisors of its users satisfy respective compliance rules 119. By ensuring that the host devices 106, virtual machines, and hypervisors of its users are operating in compliance with the compliance rules 119, the enterprise can control access to resources and thereby improve the security of devices associated with the enterprise and the users.

A compliance rule 119 can also specify remedial actions that various components should perform if a compliance rule 119 is deemed violated. For example, if a particular component violates a compliance rule 119, the compliance rule 119 can specify that the component or a feature of the non-compliant component should be modified, disabled, or uninstalled. In addition, a compliance rule 119 can specify that if a particular component violates a compliance rule 119, other components or their features should be modified, disabled, or uninstalled as a result of the non-compliant component. Further description regarding compliance rules 119 is provided below.

The host device 106 can be representative of multiple client devices that can be coupled to the network 109. The host device 106 can include a processor-based computer system, such as a desktop computer, a laptop computer, a personal digital assistant, a mobile phone, or a tablet computer.

The host device 106 can include a host operating system 123, a host management component 126, a host application 129, and a virtual machine execution environment 133. The host operating system 123 can manage hardware and software resources in the host device 106. The host operating system 123 can also provide various services, such as an interprocess communication service that can facilitate various components within the host device 106 communicating and sharing data with each other.

The host application 129 can include a set of computer programs that can perform various functionality when executed by the host device 106. For example, the host application 129 can be a word processing application, a video and image rendering application, or an email client. The user of the host device 106 can operate and interact with the host application 129 to perform various functionality.

The host management component 126 can monitor activity and settings in the host device 106, including activity and settings of components in the virtual machine execution environment 133, and determine whether compliance rules 119 associated with the host device 106 are satisfied. In some examples, the host management component 126 can parse a data object that describes the state of and settings for components in the host device 106 to determine whether compliance rules 119 are satisfied. In other examples, the host management component 126 can communicate with the management service 113 or other components in the host device 106 to determine whether the management service 113 or the other components determine that compliance rules 119 are satisfied. The host management component 126 can also communicate with various components in the host device 106, such as components in the virtual machine execution environment 133.

In some examples, the host management component 126 can be a portion of the host operating system 123. In another example, the host management component 126 can operate in the application layer of the host device 106. For instance, the host management component 126 can operate as a dedicated application that can monitor and manage data, software components, and hardware components associated with the host device 106.

In some examples, at least a portion of the host management component 126 can be included in the host application 129. To this end, the enterprise computing environment 103 can provide a software development kit (SDK) that a developer of the host application 129 can use to insert security libraries and other components of the host management component 126 into the host application 129. In another approach, the management service 113 or the developer of the host application 129 can incorporate libraries into the host application 129 through a process known as "wrapping." To wrap a host application 129, the developer or management service 113 can decompile the host application 129 and then insert the libraries into the decompiled host application 129. The developer or management service 113 can then recompile the host application 129 with the added security libraries.

When a library is incorporated into a host application 129, the functionality provided by the library can be invoked by the host management component 126 when executed in the host device 106. For example, if a security library provides the ability to monitor and enable or disable functionality provided by the host application 129, the host management component 126 can call functions provided by the library to monitor and enable or disable the functionality.

The virtual machine execution environment 133 can be an environment in which one or more virtual machines 136 execute in the host device 106. In some examples, the virtual machine execution environment 133 can be a containerized environment. In this regard, the host device 106 can prohibit the transfer of at least some data into and out of the virtual machine execution environment 133. Thus, the operation of components in the virtual machine execution environment 133 can be separate and isolated from other components in the host device 106.

The virtual machine execution environment 133 can include a hypervisor 139 and a virtual machine 136. The virtual machine 136 can be a virtualized computer instance that can emulate the operation of components of a physical computer. The hypervisor can instantiate and execute the virtual machine 136. In some examples, the hypervisor 139 can also monitor the operation of the virtual machine 136 and provide status information to the host management component 126, the management service 113, and components within the virtual machine 136. Additionally, the hypervisor 139 in some examples can control various components within the virtual machine 136.

In some examples, the hypervisor 139 can be an application that provides an execution platform for one or more virtual machines 136 by providing a containerized environment in which data is allowed to be transmitted to and from a guest operating system only if various compliance rules 119 are satisfied. The hypervisor 139 can obtain a package, such as a disk image file, for the virtual machine 136, and install or mount the package to thereby install the virtual machine 136. The hypervisor 139 can also render user interfaces for a guest operating system and cause the user interfaces to be displayed through a user interface within the host operating system 123. Additionally, the hypervisor 139 can intercept hardware calls made from the guest operating system or guest applications, potentially modify or interpret those calls, and relay the calls to the kernel of the host operating system 123. The hypervisor 139 can also control and allocate system resources for the virtual machine 136 based on management or host operating system 123 instructions and the availability of host resources. The hypervisor 139 can also function as a communication interface between the virtual machine 136 and components outside of the virtual machine execution environment 133.

The virtual machine 136 can include a guest operating system 143, a guest management component 146, and a guest application 149. The guest operating system 143 can manage emulated hardware and software resources for the virtual machine 136. The guest operating system 143 can also provide various services, such as an interprocess communication service that can facilitate various components within the virtual machine 136 communicating with each other.

The guest application 149 can include a set of computer programs that can perform various functionality when executed by the virtual machine 136. For example, the guest application 149 can be a word processing application, a video and image rendering application, or an email client. The user can run and interact with the guest application 149 to perform various functionality.

The guest management component 153 can monitor activity and settings of components in the virtual machine 136. In addition, the guest management component 153 can monitor activity and settings of components outside of the virtual machine 136. In some examples, the guest management component 146 can parse a data object that describes the states and settings of components associated with the virtual machine 136 to determine whether the compliance rules 119 are violated. In other examples, the guest management component 146 can communicate with the management service 113 or the host management component 126 to determine whether various components are compliant. The guest management component 146 can also communicate with various components in the host device 106, such as the hypervisor 139, the host management component 126, and host applications 129. For example, the guest management component 146 can communicate with the host management component 126 to inform the host management component 126 whether the guest management component 146 deems various components in the virtual machine 136 compliant with applicable compliance rules 119.

In some examples, the guest management component 146 can be a portion of the guest operating system 143. In another example, the guest management component 146 can operate in the application layer of the virtual machine 136. For instance, the guest management component 146 can operate as a dedicated application that can monitor and manage data, software components, and hardware components associated with the virtual machine 136. In other examples, the guest management component 146 can be a portion of the guest application 149 using the SDK or application wrapping techniques described above.

In some examples, the virtual machine execution environment 133 can be deployed and configured by the management service 113. Further description regarding the deployment and configuration of virtual machine execution environments 133 is provided in U.S. patent application Ser. No. 15/019,193, titled "MANAGED VIRTUAL MACHINE DEPLOYMENT" and filed on Feb. 9, 2016, which is incorporated by reference herein in its entirety.

As discussed above, the management service 113, the host management component 126, the guest management component 146, or various combinations of these components can enforce compliance rules 119 against host components in the host device 106 and guest components in the virtual machine 136 based on various conditions, such as the state of a component. According to various examples, a compliance rule 119 can be based on a static state or a dynamic state. A compliance rule 119 based on a static state can require an action to be performed regardless of the state of a component. For instance, a compliance rule 119 based on a static state can specify that the host device 106 is always required to require a login password. A compliance rule 119 based on a dynamic state can specify that a particular action should be performed if the condition of a component matches a specified condition. For instance, a compliance rule 119 based on a dynamic state can specify that enterprise data is to be made inaccessible to the host device 106 if the host device 106 is located outside of at a particular geographic location.

The state that can trigger action by a compliance rule 119 can be based on a component in the host device 106 or the virtual machine 136. For example, a compliance rule 119 can cause an action to be performed in response to the condition or configuration of an operating system component, the usage or configuration of a hardware component or virtualized hardware component, or the presence, usage, or configuration of a software component. The state that can trigger action by a compliance rule 119 can also be based on a user of the host device 106 or the virtual machine 136. For example, if the user accesses a particular application more than a specified number of times, a compliance rule 119 can cause a specified action to be performed.

As discussed above, a compliance rule 119 can invoke various types of actions. For example, a violation of a compliance rule 119 can cause functionality in the host device 106 or the virtual machine 136 to become enabled or disabled. The management service 113, host management component 126, or guest management component 146 can enable or disable functionality of a component in various ways, as will now be described.

In some examples, the management service 113 can perform an action against the host device 106 so that functionality provided in the host device 106 is enabled or disabled. For instance, the management service 113 can provide a command to the host operating system 123 to install a profile in a profile bank for the host operating system 123. The installed profile can configure the host operating system 123 so that functionality provided by the host operating system 123 is enabled or disabled as specified by the profile. In another example, the management service 113 can provide a command to the host management component 126 that causes the host management component 126 to install a profile in the profile bank for the host operating system 123. In addition, an installed profile can specify a setting, such as an operating system registry value or an application-level setting, that enables or disables particular functionality.

Additionally, the management service 113 can perform an action against the host device 106 by providing a command that is routed through the guest management component 146. For instance, the guest management component 146 can provide a command to the host operating system 123 to install a profile and thereby enable or disable functionality provided by the host operating system 123. Alternatively, the guest management component 146 can provide a command to the host management component 126, which can then install the profile to enable or disable functionality as specified by the profile. According to various examples, the guest management component 146 can transmit the command through the hypervisor 139, or the guest management component 146 can provide the command directly to the intended destination of the command. Furthermore, the management service 113 can transmit a command directly to the hypervisor 139, and the hypervisor 139 can then forward the command to the host operating system 123 or the host management component 126, which can then configure the host operating system 123 or the host application 129, as described above.

The management service 113 can also perform an action against the host application 129 so that functionality provided by the host application 129 is enabled or disabled. To this end, the management service 113 can provide a command to the host management component 126 to configure the host application 129. In such an example, the host management component 126 can install an application profile that can configure the host application 129 to thereby enable or disable functionality as specified by the profile. For examples in which at least a portion of host management component 126 is included in the host application 129 through an SDK or application wrapping techniques, the host management component 126 can configure the host application 129 by making function calls, as described above. Furthermore, the command originated from the management service 113 can be routed through the guest management component 146 or the hypervisor 139.

The management service 113 can also perform an action against the hypervisor 139, such as enabling or disabling a setting or configuration of the hypervisor 139 to thereby enable or disable functionality provided by the hypervisor 139. To this end, the management service 113 can transmit a command to the hypervisor 139 instructing the hypervisor 139 to enable or disable a setting or configuration. In other examples, the management service 113 can transmit a command to the host management component 126 or the guest management component 146 for the host management component 126 or the guest management component 146 to forward the command to the hypervisor 139. Furthermore, the management service 113 can transmit a command to the host management component 126, and the host management component 126 can forward the command to the guest management component 146. Once the guest management component 146 receives the command from the host management component 126, the guest management component 146 can forward the command to the hypervisor 139. Alternatively, the management service 113 can transmit a command to the guest management component 146, and the guest management component 146 can forward the command to the host management component 126. Once the host management component 126 receives the command from the guest management component 146, the host management component 126 can forward the command to the hypervisor 139.

The management service 113 can also perform an action against the virtual machine 136 through action by the hypervisor 139. To this end, the management service 113 can transmit a command to the hypervisor 139 that instructs the hypervisor 139 to enable or disable functionality provided by the hypervisor 139. In another example, the management service 113 can transmit a command to the host management component 126 or the guest management component 146, which can then forward the command to the hypervisor 139 to instruct the hypervisor 139 to enable or disable specified functionality.

Moreover, the management service 113 can perform an action against guest components in the virtual machine 136, such as actions against the guest operating system 143 or the guest application 149. To this end, the management service 113 can transmit a command to the guest operating system 143 to install a profile in a profile bank for the guest operating system 143. The installed profile can configure the guest operating system 143 so that functionality provided by the guest operating system 143 is enabled or disabled as specified by the profile. In another example, the management service 113 can provide a command to the guest management component 146 instructing the guest management component 146 to install a profile in the profile bank for the guest operating system 143.

Additionally, the management service 113 can perform an action against a component in the virtual machine 136 by providing a command that is routed through the host management component 126. For instance, the host management component 126 can provide a command to the guest operating system 143 instructing the guest operating system 143 to install a profile and thereby enable or disable functionality provided by the guest operating system 143. Alternatively, the host management component 126 can provide a command to the guest management component 146, which can then install the profile to enable or disable functionality as specified by the profile. According to various examples, the host management component 126 can transmit the command through the hypervisor 139, or the host management component 126 can provide the command directly to the intended destination of the command. Furthermore, the management service 113 can transmit a command directly to the hypervisor 139, and the hypervisor 139 can then forward the command to the guest operating system 143 or the guest management component 146, which can then configure the guest operating system 143 or the guest application 149.

The management service 113 can also perform an action against the guest application 149 so that functionality provided by the guest application 149 is enabled or disabled. To this end, the management service 113 can provide a command to the guest management component 146 to configure the guest application 149. In such an example, the guest management component 146 can install an application profile that can configure the guest application 149 to thereby enable or disable functionality as specified by the profile. For examples in which at least a portion of guest management component 146 is included in the guest application 149 through an SDK or application wrapping techniques, the guest management component 146 can configure the guest application 149 by making function calls, as described above. Furthermore, the command originating from the management service 113 can be routed through the host management component 126 or the hypervisor 139 in various examples.

As discussed above, a compliance rule 119 can specify that a component is to perform a particular action in response to a compliance rule 119 being violated. Examples of actions to perform in response to a compliance rule 119 violation follow.

Some actions can involve the virtual machine 136. For example, a component can perform an action that includes modifying a setting that specifies whether the host device 106 or the user of the host device 106 is authorized to use the virtual machine 136. An action can also involve modifying an expiration date for the virtual machine 136. Another action can modify whether a device is permitted to remotely destroy the virtual machine 136. Other examples of actions can modify the amount of virtualized processor, memory, network, storage space, processor cores, and process priorities that the virtual machine 136 is allocated.

Further actions that can be taken against the virtual machine 136 include modifying whether the virtual machine 136 is permitted to map a virtual disk to a local volume or whether the virtual machine 136 is permitted to map network drives to a local volume. Some actions can enable or disable the ability of the virtual machine 136 to share folders with the host device 106 or other devices. Other actions can involve whether the virtual machine 136 can access virtual or physical storage drives or interfaces.

Moreover, some actions can involve enabling, disabling, and configuring disk encryption for the virtual machine 136. For instance, a compliance rule 119 violation can cause particular directories or an entire disk to be encrypted for the virtual machine 136 and can also specify an encryption key length. Other actions can enable, disable, or configure backup schedules for the virtual machine 136. For instance, a component can specify whether a backup is generated upon shutdown of the virtual machine 136, the storage location of backups, the frequency of backups, and the quantity and expiration of backups to be stored in association with the virtual machine 136.

Some actions can involve modifications to the manner in which the virtual machine 136 accesses the network 109. For example, an action can enable, disable, or modify a virtualized network interface for the virtual machine 136. Another action can modify whether the virtual machine 136 can automatically connect to the network 109 upon boot-up. Another example of an action can specify whether the virtual machine 136 can bridge to a physical network interface in the host device 106. An action specified by a compliance rule 119 can also modify whether the virtual machine 136 shares the same interne protocol (IP) address as the host device 106 or whether a private network is created between the virtual machine 136 and the host device 106. Furthermore, an action can specify whether the virtual machine 136 can attached to the network 109 through a particular LAN segment or multiple LAN segments.

An action specified by a compliance rule 119 can also determine whether the hypervisor 139 should throttle or restrict traffic to or from the virtual machine 136. Another action can specify whether a virtual network connection (VNC) is permitted for the virtual machine 136 or whether a user can login to the virtual machine 136 remotely. Furthermore, an action can determine whether the virtual machine 136 is to use a proxy service for network 109 traffic. Some compliance rules 119 can also cause particular uniform resource locators (URLs), files, or types of content to become whitelisted or blacklisted for the virtual machine 136.

Some compliance rules 119 can cause actions to be performed that modify functionality associated with physical hardware in the host device 106 or virtual hardware provided by the hypervisor 139. For instance, an action can modify which types of universal serial bus (USB) devices are accessible to the virtual machine 136 and which USB protocol version is to be used by the virtual machine 136. Another action can change whether the virtual machine 136 is permitted to automatically connect to a new USB device. An action can also modify whether a specific USB controller is to be used for the virtual machine 136.

Some compliance rules 119 can also modify settings for a BLUETOOTH protocol interface or a near-field communication (NFC) interface. For example, an action triggered by a violation of a compliance rule 119 can determine whether the virtual machine 136 has access to the interfaces provided by the host device 106. Other actions can modify whether the virtual machine 136 has access to various serial or parallel interfaces, such as a small computer system interface (SCSI) port.

Other compliance rules 119 can trigger actions that modify settings for sound cards, printers, and display hardware. For example, an action can change whether the virtual machine 136 can use a printer in communication with the host device 106. Other actions can modify whether the virtual machine 136 can display content through a display device in communication with the host device 106. Furthermore, actions can change the number of display devices that the virtual machine 136 can use, the resolution of content rendered by the virtual machine 136, or whether the virtual machine 136 can use graphics acceleration hardware provided by the host device 106. A compliance rule 119 can also determine whether the virtual machine 136 is to synchronize its system with the host device 106 and whether the virtual machine 136 is permitted to modify the system time of the host device 106.

Other compliance rules 119 can affect the user experience of the virtual machine 136. For example, violation of a compliance rule 119 can modify whether the virtual machine 136 is permitted to run in a full screen mode or whether the virtual machine 136 should run in a full screen mode automatically upon boot-up. Another action can modify whether the virtual machine 136 it to operate in a mode that makes components executing in the virtual machine 136 appear to be executing natively by the host operating system 123. In some examples, the hypervisor 139 can be a VMWARE virtualization product, and an action can cause the hypervisor 139 to operate in "Unity mode." In other examples, the hypervisor 139 can be a PARALLELS virtualization product, and the management service 113 can cause the hypervisor 139 to operate in "coherence mode." Another compliance rule 119 can specify whether user interfaces or content rendered through the virtual machine 136 should include indicia, such as icons or badges, indicating that the user interfaces or content are associated with the virtual machine 136.

Another compliance rule 119 can specify an action that modifies whether the hypervisor 139 is to close automatically without user intervention in response to the virtual machine 136 being shut down. Another example of an action can be modifying whether clipboard operations, such as cut/copy/paste functionality or drag and drop functionality, are permitted across the virtual machine 136 and the host device 106. Another action can modify the ability to have drivers or other components for the virtual machine 136 automatically update.

Next, examples of the operation of the networked environment 100 are described. The following discussion assumes that the host operating system 123, host management component 126, host application 129, and hypervisor 139 are installed in the client device. In addition, the following discussion assumes that the virtual machine 136 is installed in the virtual machine execution environment 133 and that the guest operating system 143, guest management component 146, and guest application 149 are being executed by the virtual machine 136.

To begin, the host management component 126 and the guest management component 146 can monitor the activity in the host device 106 and the virtual machine 136 and determine whether any compliance rules 119 are violated. In some examples, the host management component 126 and the guest management component 146 can periodically determine whether compliance rules 119 are violated. In other examples, the host management component 126 and the guest management component 146 can determine whether compliance rules 119 are violated in response to a trigger event, such as receiving a request from the management service 113 to perform a compliance check or detecting that a new component has been installed in the host device 106. Below, examples of the host management component 126 enforcing compliance rules 119 are first provided, followed by examples of the guest management component 146 enforcing compliance rules 119.

The host management component 126 can determine whether compliance rules 119 are violated in various ways. In some examples, the host management component 126 can generate a data object that specifies conditions, including states, settings, and parameters, of the host device 106. For example, the data object can specify whether the host device 106 is enrolled with the management service 113, the particular type and version of the host operating system 123, a list of the files stored in the host device 106, a list of the host applications 129 installed in the host device 106, the particular type and version of a basic input/output system (BIOS) in the host device 106, the particular type and version of a unified extensible firmware interface (UEFI) in the host device 106, and the type and version of any malware protection components installed in the host device 106. In addition, the data object can specify the geographic location of the host device 106, the network access points or LANs to which the host device 106 is in communication, and the time of the last malware scan performed in the host device 106.

The data object for the host device 106 can also specify conditions of the hypervisor 139. For instance, the data object can specify whether the hypervisor 139 is enrolled with the management service 113, the type and version of the hypervisor 139, the type and version of a kernel associated with the hypervisor 139, and the types and versions of virtualized device drivers associated with the hypervisor 139.

Once the data object for the host device 106 is generated, the host management component 126 can parse the data object and compare the data object to the compliance rules 119 to determine whether any compliance rules 119 are violated. For example, if a compliance rule 119 specifies that the host device 106 is prohibited from installing a particular host application 129, and if the data object indicates that the particular host application 129 is installed in the host device 106, the host management component 126 can determine that the compliance rule 119 is violated.

In another example, the host management component 126 can provide the data object describing conditions of the host device 106 to the management service 113 with a request for the management service 113 to perform the compliance rule 119 evaluation. The management service 113 can then evaluate the conditions specified in the data object and return a message specifying which compliance rules 119 are violated, if any.

In other examples, the host management component 126 can provide the data object specifying conditions of the host device 106 to the guest management component 146 along with a request for the guest management component 146 to perform the compliance rule 119 evaluation. The guest management component 146 can then evaluate the conditions specified by the data object and return a message identifying any violated compliance rules 119.

Furthermore, the host management component 126 can receive a data object specifying conditions of the virtual machine 136 that the guest management component 146 has generated. The host management component 126 can determine whether conditions specified by the data object violate compliance rules 119. In addition, the guest management component 146 can evaluate conditions of the virtual machine 136 specified by the data object and notify the host management component 126 of any violations.

Once the host management component 126 determines that a compliance rule 119 is violated by, for example, evaluating conditions itself or by receiving an evaluation report from the management service 113 or the guest management component 146, the host management component 126 can determine a remedial action to perform in response to the violation. As discussed above, the compliance rules 119 can specify remedial actions that the host management component 126 should perform in the event of a violation. For instance, a compliance rule 119 can specify that if a particular component is not enrolled with the management service 113, the host management component 126 should initiate the process of enrolling the component with the management service 113. As another example, a compliance rule 119 can specify that if a configuration, such as a setting or parameter of a component, violates a compliance rule 119, the host management component 126 should modify the configuration so that the component becomes compliant. Another compliance rule 119 can specify that the host management component 126 could request the host management component 126 to perform an action.

In other examples, the compliance rule 119 can specify that the host management component 126 should uninstall a component, such as the hypervisor 139 or virtual machine 136, and replace the component with a different type or version of the component. Other compliance rules 119 can specify that the host management component 126 should disable network 109 connectivity or lock the host device 106, hypervisor 139, or virtual machine 136. Some compliance rules 119 can specify that the host management component 126 should notify the user of the host device 106 or an administrator of the enterprise computing environment 103 of the violation of the compliance rule 119 and prompt the user or administrator to select a particular remedial action from a list of remedial actions that the host management component 126 should perform.

For a compliance rule 119 that protects against severe security breaches, the compliance rule 119 can specify that the host management component 126 should perform a more severe remedial action. For example, a compliance rule 119 can specify that the host management component 126 should unenroll a component, such as the hypervisor 139 or the virtual machine 136, from the management service 113, thereby restricting the functionality and resources to which the component can access. A compliance rule 119 can also specify that, if the compliance rule 119 is violated, the host management component 126 should remove enterprise data associated with the management service 113. Another compliance rule 119 can specify that the host management component 126 should remove personal data and enterprise data associated with the management service 113 in response to a compliance rule 119 violation. In addition, a compliance rule 119 can specify that the host management component 126 should cause the host device 106 or the virtual machine 136 to perform a "factory" reset so that the host device 106 or the virtual machine 136 is returned to a default state specified by a manufacturer or seller of the host device 106 or virtual machine 136.

After the host management component 126 determines an action to perform, the host management component 126 can initiate the action. In some examples, the host management component 126 can directly control components in both the host device 106 and the virtual machine 136. In these examples, the host management component 126 can implement the remedial action by, for example, providing an application programming interface (API) call to the host operating system 123, the host application 129, the hypervisor 139, the guest operating system 143, the guest management component 146, or the guest application 149. For example, the host management component 126 can provide an API call to the guest operating system 143 to uninstall the guest application 149. As another example, the host management component 126 can issue an API call to the hypervisor 139 to cause the hypervisor 139 to perform an action, such as to turn off connectivity between the virtual machine 136 and the network 109.

In some examples, the host management component 126 cannot directly control a component that should be modified as specified by a compliance rule 119. In such an example, the host management component 126 can communicate with the hypervisor 139 or the guest management component 146 that can directly control the component. For instance, in some examples, the host management component 126 can send a message to the hypervisor 139 requesting the hypervisor 139 to perform a particular action, such as shutting down the virtual machine 136. As another example, the host management component 126 can request the guest management component 146 to perform an action, such as uninstalling the guest application 149.

Thus, as described above, the host management component 126 can monitor conditions of the host device 106, hypervisor 139, and virtual machine 136 and determine whether compliance rules 119 are satisfied. In addition, the host management component 126 can enforce the compliance rules 119 by performing remedial actions against the host device 106, the hypervisor 139, and the virtual machine 136.

Similarly, the guest management component 146 can monitor conditions of the virtual machine 136, the hypervisor 139, and the host device 106 and enforce the compliance rules 119 by performing remedial actions against the virtual machine 136, the hypervisor 139, and the host device 106. The guest management component 146 can determine whether compliance rules 119 are violated in numerous ways. In some examples, the guest management component 146 can generate a data object that specifies conditions, including states, settings, and parameters, of the virtual machine 136. The data object for the virtual machine 136 can specify whether the virtual machine 136 is enrolled with the management service 113, the particular type and version of the guest operating system 143, a list of the files stored in the virtual machine 136, a list of the guest applications 149 installed in the virtual machine 136, the particular type and version of a basic input/output system (BIOS) in the virtual machine 136, the particular type and version of a unified extensible firmware interface (UEFI) in the virtual machine 136, and the type and version of any malware protection components installed in the virtual machine 136. In addition, the data object can specify the geographic location of the virtual machine 136, the network access points or local area networks (LANs) to which the virtual machine 136 is in communication, and the time of the last malware scan performed in the virtual machine 136.

The data object for the virtual machine 136 can also specify conditions of the hypervisor 139. For instance, the data object for the virtual machine 136 can specify whether the hypervisor 139 is enrolled with the management service 113, the type and version of the hypervisor 139, the type and version of a kernel associated with the hypervisor 139, and the types and versions of virtualized device drivers associated with the hypervisor 139.

Once the data object for the virtual machine 136 is generated, the guest management component 146 can parse the data object and compare the data object to the compliance rules 119 to determine whether any compliance rules 119 are violated. For example, if a compliance rule 119 specifies that the virtual machine 136 is prohibited from installing a particular guest application 149, and if the data object indicates that the particular guest application 149 is installed in the virtual machine 136, the guest management component 146 can determine that the compliance rule 119 is violated.

In another example, the guest management component 146 can provide the data object specifying conditions of the virtual machine 136 to the management service 113 along with a request for the management service 113 to perform the compliance rule 119 evaluation. The management service 113 can then evaluate the data object specifying conditions of the virtual machine 136 and return a message specifying which compliance rules 119 are violated, if any.

In other examples, the guest management component 146 can provide the data object specifying conditions of the virtual machine 136 to the host management component 126 with a request for the host management component 126 to perform the compliance rule 119 evaluation. The host management component 126 can then evaluate the data object and return a message identifying any violated compliance rules 119.

Furthermore, the guest management component 146 can receive a data object specifying conditions of the host device 106 that the host management component 126 has generated. The guest management component 146 can determine whether conditions specified by the data object for the host device 106 violate compliance rules 119. In addition, the host management component 126 can evaluate the data object for the host device 106 and notify the guest management component 146 of any violations.

Once the guest management component 146 determines that a compliance rule 119 is violated by, for example, evaluating the conditions of the host device 106 and virtual machine 136 itself or by receiving an evaluation report from the management service 113 or the host management component 126, the guest management component 146 can determine a remedial action to perform. As discussed above, the compliance rules 119 can specify remedial actions that the guest management component 146 should perform in the event of a violation. For instance, a compliance rule 119 can specify that if a particular device or virtual device is not enrolled with the management service 113, the guest management component 146 should initiate the process of enrolling the device or virtual device with the management service 113. As another example, a compliance rule 119 can specify that if a configuration, such as a setting or parameter, of a component violates a compliance rule 119, the guest management component 146 should modify the configuration so that the component becomes compliant. Some compliance rules 119 can specify that the guest management component 146 should request the management service 113 to perform an action.

In other examples, the compliance rule 119 can specify that the guest management component 146 should uninstall a component, such as the guest application 149, and replace the component with a different type or version of the component. Other compliance rules 119 can specify that the guest management component 146 should disable network 109 connectivity or lock the host device 106, hypervisor 139, or virtual machine 136. Some compliance rules 119 can specify that the guest management component 146 should notify the user of the host device 106 or an administrator of the enterprise computing environment 103 of the violation of the compliance rule 119 and prompt the user or administrator to select a particular remedial action that the guest management component 146 should perform.

For a compliance rule 119 that protects against relatively severe security breaches, the compliance rule 119 can specify that the guest management component 146 should perform a more severe remedial action. For example, a compliance rule 119 can specify that the guest management component 146 should unenroll a component, such as the hypervisor 139, the host device 106, or the virtual machine 136, from the management service 113, thereby restricting the functionality and resources to which the component can access. A compliance rule 119 can also specify that, if the compliance rule 119 is violated, the guest management component 146 should remove enterprise data associated with the management service 113. Another compliance rule 119 can specify that the guest management component 146 should remove personal data and enterprise data associated with the management service 113 in response to a compliance rule 119 violation. In addition, a compliance rule 119 can specify that the guest management component 146 should cause the host device 106 or the virtual machine 136 to perform a "factory" reset.

After the guest management component 146 determines an action to perform, the guest management component 146 can initiate the action. In some examples, the guest management component 146 can directly control components in both the host device 106 and the virtual machine 136. In these examples, the guest management component 146 can implement the remedial action by, for example, making an application programming interface (API) call to the host operating system 123, the host management component 126, the host application 129, the hypervisor 139, the guest operating system 143, or the guest application 149. For example, the guest management component 146 can issue an API call to the host operating system 123 to perform a factory reset. As another example, the guest management component 146 can issue an API call to the hypervisor 139 to cause the hypervisor 139 to perform an action.

In some examples, the guest management component 146 cannot directly control a component that should be modified as specified by a compliance rule 119. In such an example, the guest management component 146 can communicate with the hypervisor 139 or the host management component 126 that can directly control the component. For instance, in some examples, the guest management component 146 can send a message to the hypervisor 139 requesting the hypervisor 139 to perform a particular action, such as turning off a network 109 interface. As another example, the guest management component 146 can request the host management component 126 to perform an action, such as deleting the virtual machine 136. Moreover, the guest management component 146 can request the management service 113 to cause an action to be performed.

Thus, as described above, the guest management component 146 can monitor conditions of the host device 106, hypervisor 139, and virtual machine 136 and determine whether compliance rules 119 are satisfied. In addition, the guest management component 146 can enforce the compliance rules 119 by performing remedial actions against the host device 106, the hypervisor 139, and the virtual machine 136.

Figure 2A:
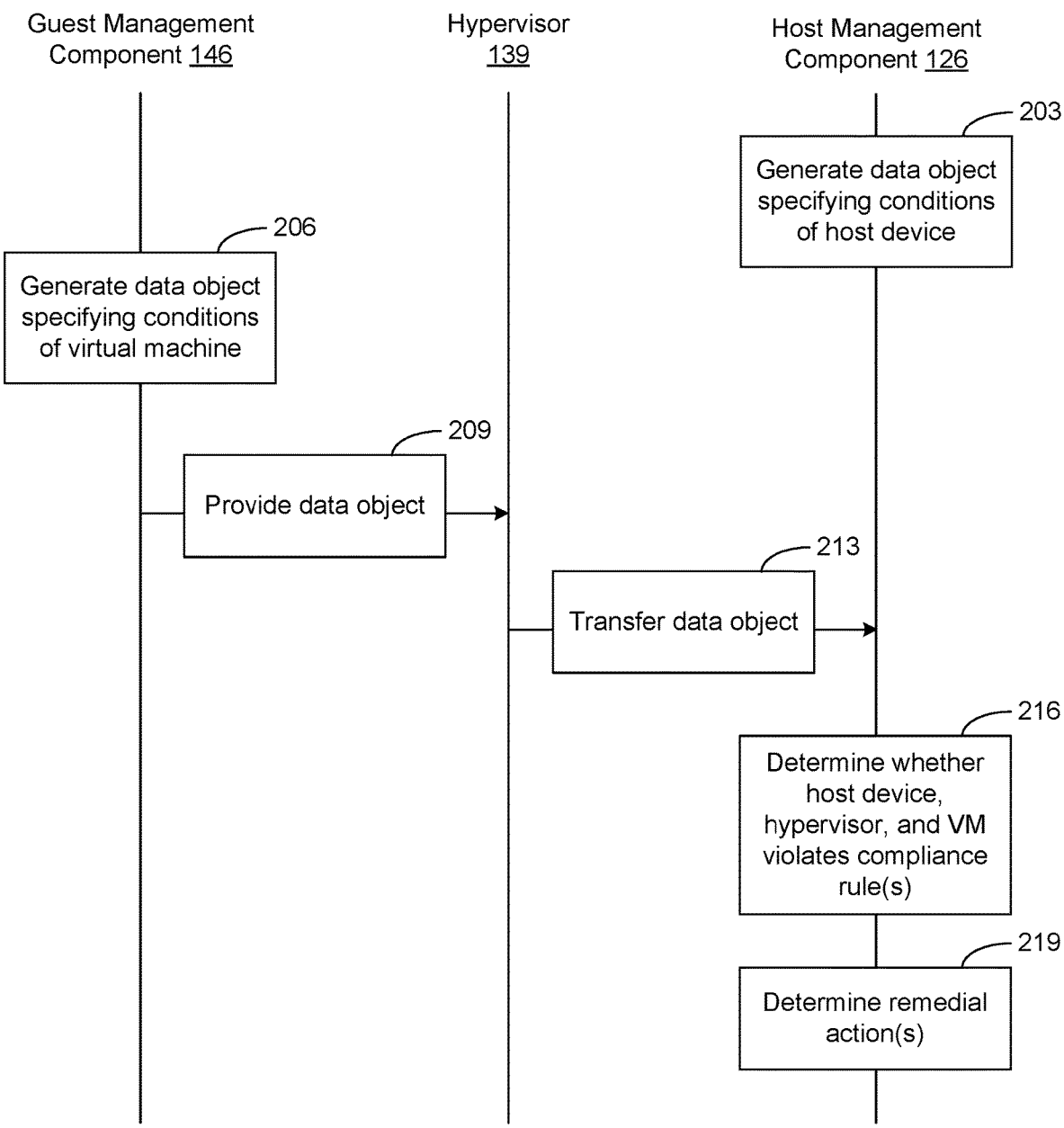
FIGS. 2A-2B show a sequence diagram illustrating an example of component interaction.
Figure 2B:
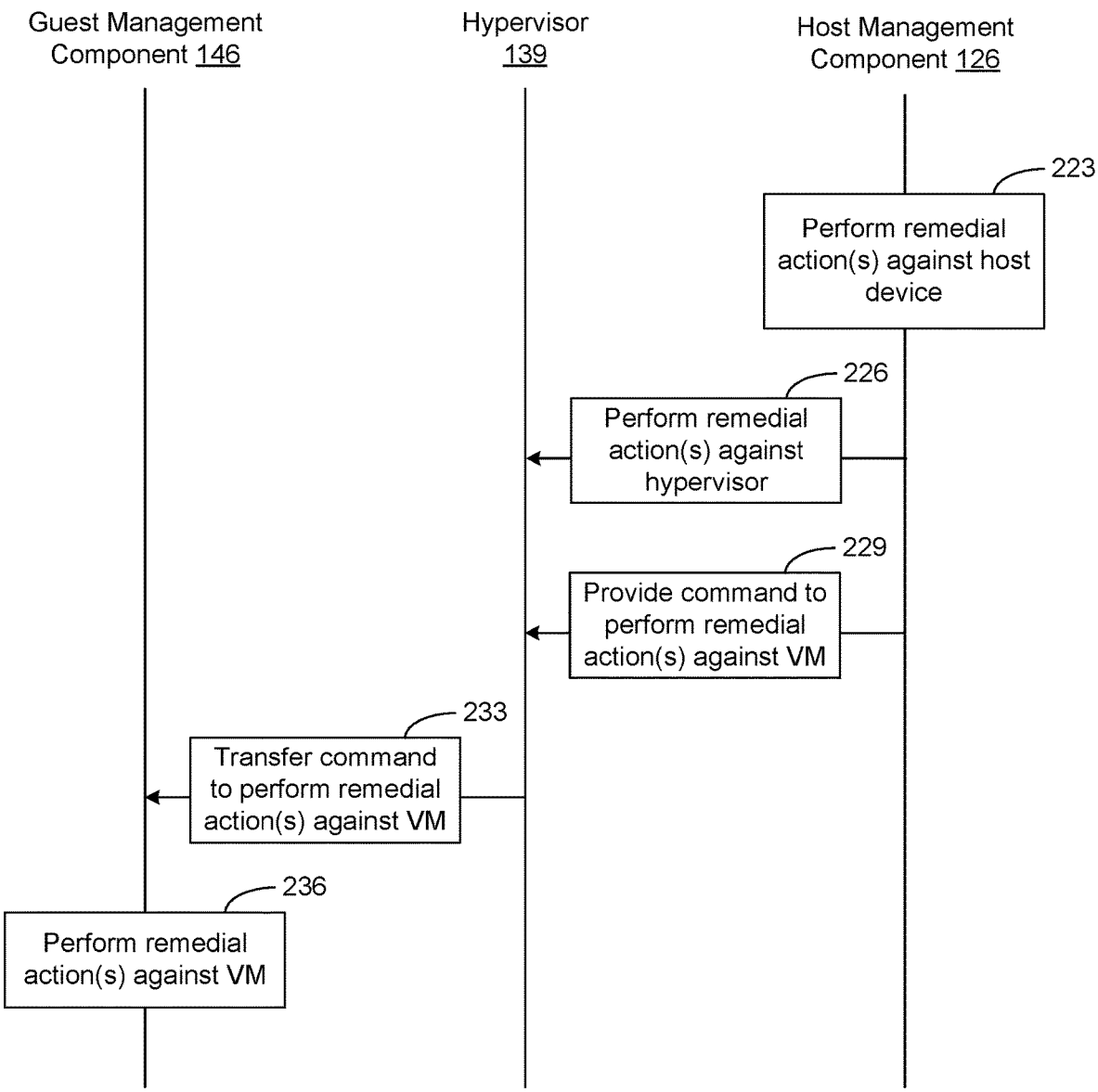

With reference to FIGS. 2A-2B, shown is a sequence diagram illustrating an example of interactions of components in the networked environment 100. The sequence diagram of FIGS. 2A-2B illustrates an example of the host management component 126 enforcing compliance rules 119.

Beginning with step 203, the host management component 126 can generate a data object specifying conditions of the host device 106. As described above, the data object for the host device 106 can specify conditions, including states, settings, and parameters, of the host operating system 123, the hypervisor 139, and the host application 129.

Additionally, the guest management component 146 can generate a data object specifying conditions of the virtual machine 136, as shown at step 206. The data object can specify conditions, including states, settings, and parameters, of the guest operating system 143, and the guest application 149. Once the guest management component 146 generates the data object specifying conditions of the virtual machine 136, the guest management component 146 can provide the data object to the hypervisor 139, as indicated at step 209. Then, at step 213, the hypervisor 139 can transfer the data object to the host management component 126.

As shown at step 216, the host management component can determine whether the host device 106, the hypervisor 139, and the virtual machine 136 violate any compliance rules 119 assigned to the host device 106 or the virtual machine 136. To this end, the host management component 126 can compare the data objects specifying conditions of the host device 106 and the virtual machine 136 to the compliance rules 119 associated with the host device 106 and the virtual machine 136. In other examples, the host management component 126 can request the management service 113 or the guest management component 146 to perform the compliance rule 119 evaluation and to provide the host management component 126 with the results of the evaluation.

In the example shown in FIGS. 2A-2B, the host management component 126 determined that a compliance rule 119 is violated. As such, at step 219, the host management component 126 can determine remedial actions to perform in response to the compliance rule 119 violation. In various examples, the host management component 126 can perform remedial actions against the particular component that violated the compliance rule 119 or against other components in the host device 106. As described above, the compliance rule 119 can specify the actions that the host management component 126 should perform in response to a violation.

In the example shown in FIGS. 2A-2B, the host management component 126 determined to perform remedial actions against the host device 106, the hypervisor 139, and the virtual machine 136. At step 223, which is shown in FIG. 2B, the host management component 126 can perform the remedial action against the host device 106. For example, the host management component 126 can instruct the host operating system 123 to prevent the host application 129 from being executed.

In addition, at step 226, the host management component 126 can perform the remedial action against the hypervisor 139. For example, the host management component 126 can command the hypervisor 139 to disable a network 109 interface provided by the hypervisor 139.

Furthermore, as shown at step 229, the host management component 126 can provide a command to the hypervisor 139 that instructs the guest management component 146 to perform a particular remedial action. When the hypervisor 139 receives the command, the hypervisor 139 can transfer the command to the guest management component 146, as indicated at step 233.

Once the guest management component 146 receives the command, the guest management component 146 can perform the specified remedial action against the virtual machine 136, as shown at step 236. For example, the guest management component 146 can instruct the guest operating system 143 to prohibit access to enterprise resources stored in the virtual machine 136. Thereafter, the process can end.

Figure 3A:
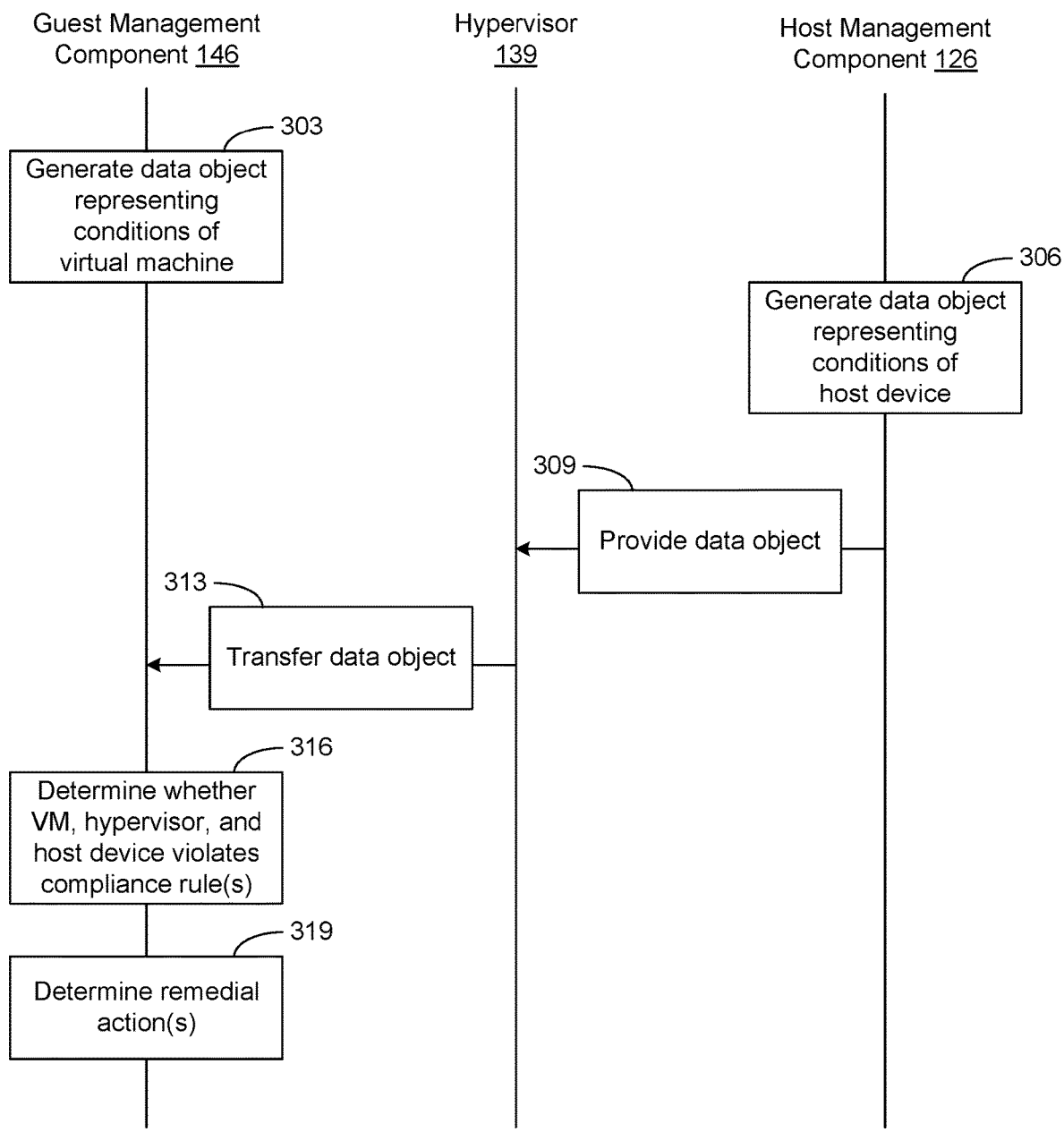
FIGS. 3A-3B show a sequence diagram illustrating another example of component interaction.
Figure 3B:
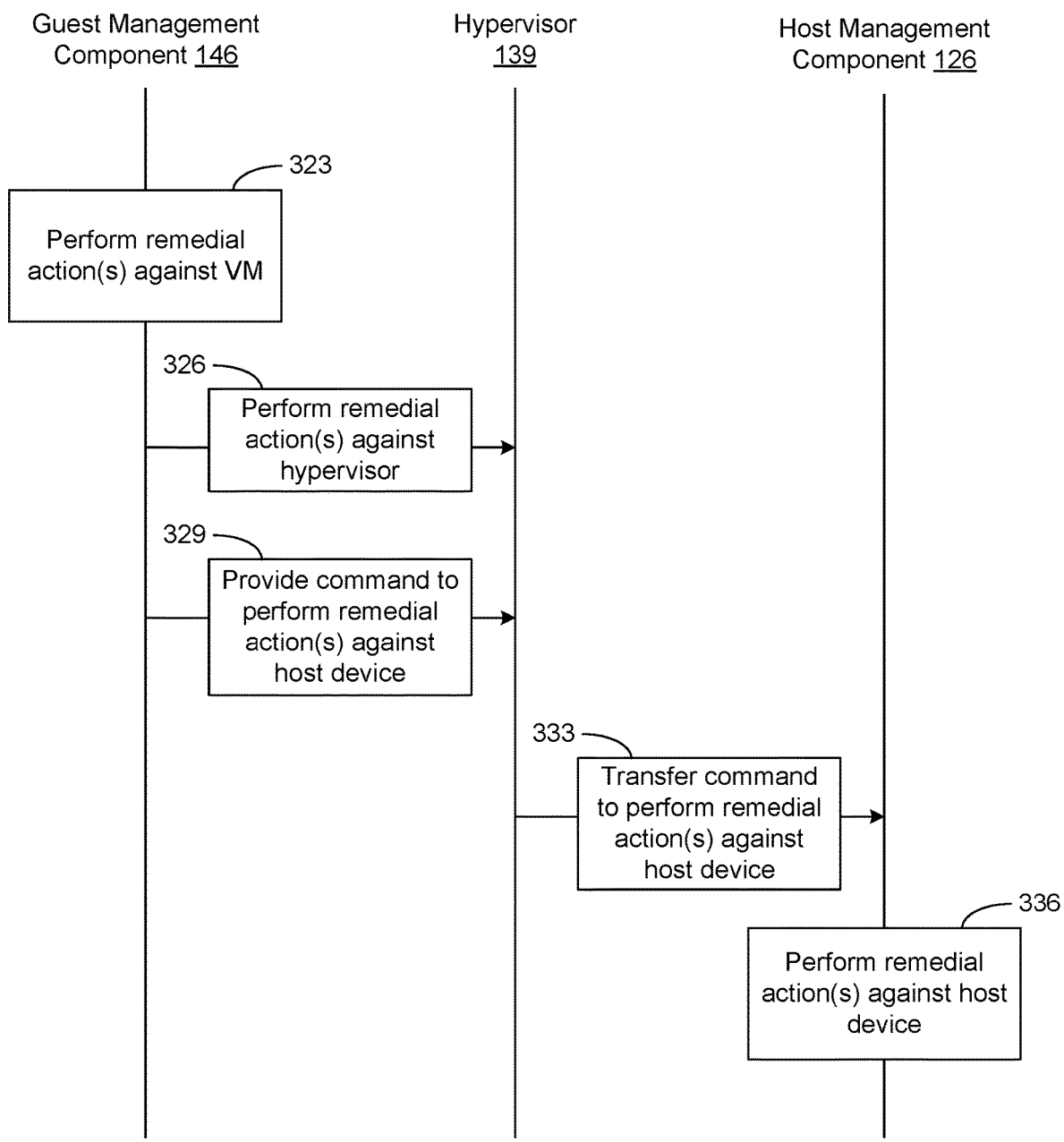

With reference to FIGS. 3A-3B, shown is a sequence diagram illustrating another example of interactions of components in the networked environment 100. The sequence diagram of FIGS. 3A-3B illustrates an example of the guest management component 146 enforcing compliance rules 119.

Beginning with step 303, the guest management component 146 can generate a data object describing conditions of the virtual machine 136. As described above, the data object can specify conditions, including states, settings, and parameters, of the guest operating system 143 and the guest application 149.

Additionally, the host management component 126 can generate a data object describing conditions of the host device 106, as shown at step 306. The data object for the host device 106 can specify conditions, including states, settings, and parameters, of components in the host device 106. Once the host management component 126 generates the data object specifying conditions of the host device 106, the host management component 126 can provide the data object to the hypervisor 139, as indicated at step 309. Then, at step 313, the hypervisor 139 can transfer the data object to the guest management component 146.

As shown at step 316, the guest management component 146 can determine whether the virtual machine 136, the hypervisor 139, and the host device 106 violate any compliance rules 119 assigned to the virtual machine 136 or host device 106. To this end, the guest management component 146 can compare the data objects specifying conditions of the virtual machine 136 and the host device 106 to the compliance rules 119 associated with the virtual machine 136 and the host device 106. In other examples, the guest management component 146 can request the management service 113 or the host management component 126 to perform the compliance rule 119 evaluation and to provide the guest management component 146 with the results of the evaluation.

In the example shown in FIGS. 3A-3B, the guest management component 146 determined that a compliance rule 119 is violated, as indicated at step 319. As such, at step 319, the guest management component 146 can determine remedial actions to perform in response to the compliance rule 119 violation. In various examples, the guest management component 146 can perform remedial actions against the particular component that violated the compliance rule 119 or against other components in the host device 106. As described above, the compliance rule 119 can specify the actions that the guest management component 146 should perform in response to a violation.

In the example shown in FIGS. 3A-3B, the guest management component 146 determined to perform remedial actions against the virtual machine 136, the hypervisor 139, and the host device 106. At step 323, which is shown in FIG. 3B, the guest management component 146 can perform the remedial action against the virtual machine 136. For example, the guest management component 146 can instruct the guest operating system 143 to uninstall the guest application 149.

In addition, at step 326, the guest management component 146 can perform the remedial action against the hypervisor 139. For example, the guest management component 146 can command the hypervisor 139 to prevent enterprise files from being transferred through the hypervisor 139.

Furthermore, as shown at step 329, the guest management component 146 can provide a command to the hypervisor 139 that instructs the host management component 126 to perform a particular remedial action. When the hypervisor 139 receives the command, the hypervisor 139 can transfer the command to the host management component 126, as indicated at step 333.

Once the host management component 126 receives the command, the host management component 126 can perform the specified remedial action against the host device 106, as shown at step 336. For example, the guest management component 146 can disable copy and paste functionality in the host device 106. Thereafter, the process can end.

Figure 4:
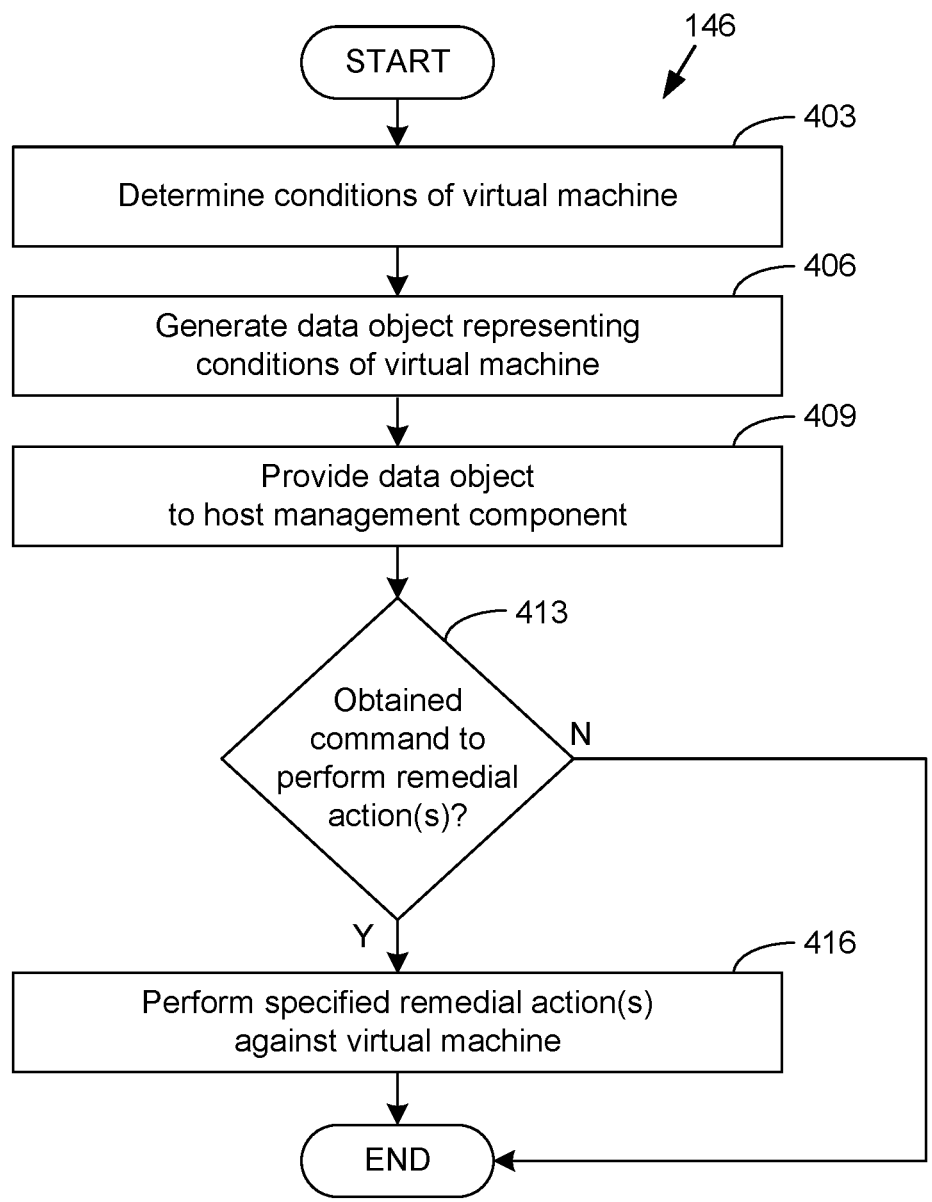
FIG. 4 shows a flowchart illustrating an example of functionality implemented by a guest management component.

With reference to FIG. 4, shown is a flowchart that provides an example of a portion of the operation of the guest management component 146. In particular, FIG. 4 provides an example of the guest management component 146 providing a data object specifying conditions of the virtual machine 136 to the host management component 126 and then performing a remedial action.

Beginning with step 403, the guest management component 146 can determine conditions of the virtual machine 136. For example, the guest management component 146 can determine a list of guest applications 149 installed in the virtual machine 136 and the particular type and version of the guest operating system 143. The guest management component 146 can also identify the location of the virtual machine 136 and a particular LAN to which the virtual machine 136 is in communication.

As shown at step 406, the guest management component 146 can generate a data object specifying the conditions of the virtual machine 136, as determined at step 403. Then, as indicated at step 409, the guest management component 146 can provide the data object specifying conditions of the virtual machine to the host management component 126. In some examples, the guest management component 146 can transfer the data object to the host management component 126 through the hypervisor 139.

At step 413, the guest management component 146 can determine whether it obtained a command to perform a remedial action. The guest management component 146 can receive the command from, for example, the host management component 126. If the guest management component 146 did not obtain a command to perform a remedial action, the process can end. Otherwise, if the guest management component 146 obtains a command to perform a remedial action, the guest management component 146 can proceed to step 416 and perform the specified remedial action against the virtual machine 136. For instance, the guest management component 146 can uninstall the guest application 149 or delete data in the virtual machine 136. Thereafter, the process can end.

Figure 5A:
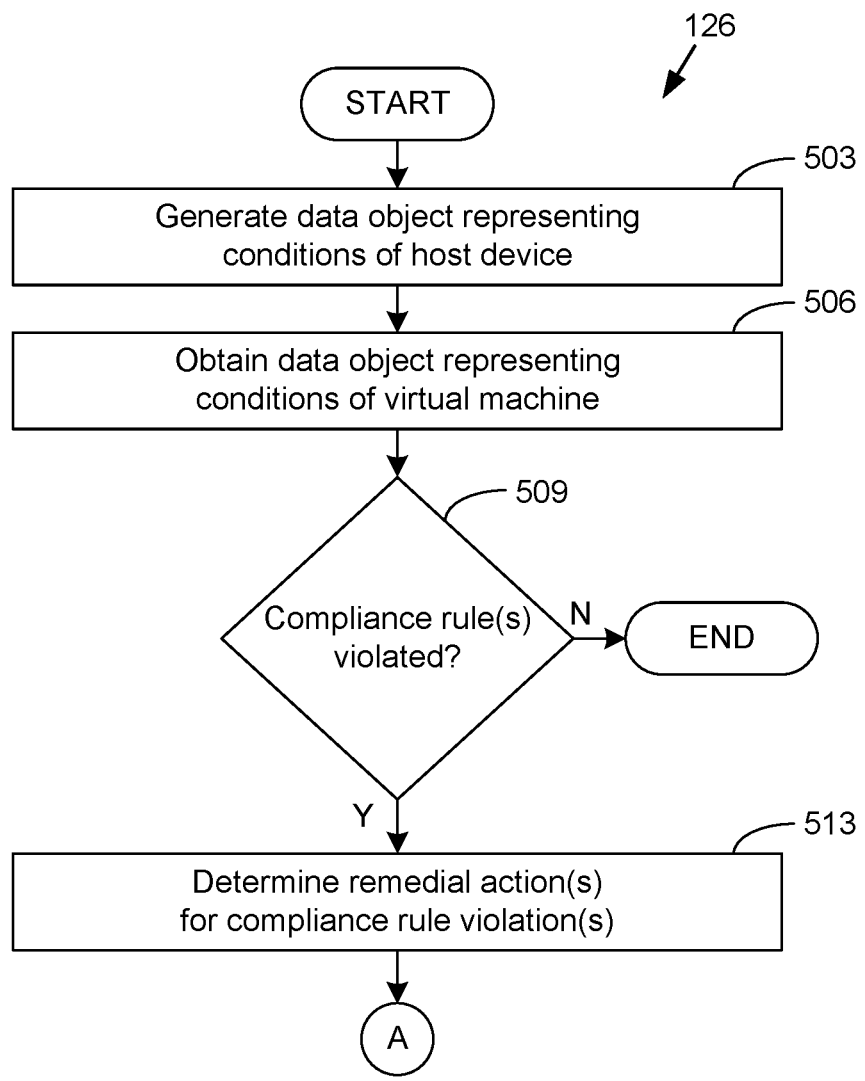
FIGS. 5A-5B show a flowchart illustrating an example of functionality implemented by a host management component.
Figure 5B:
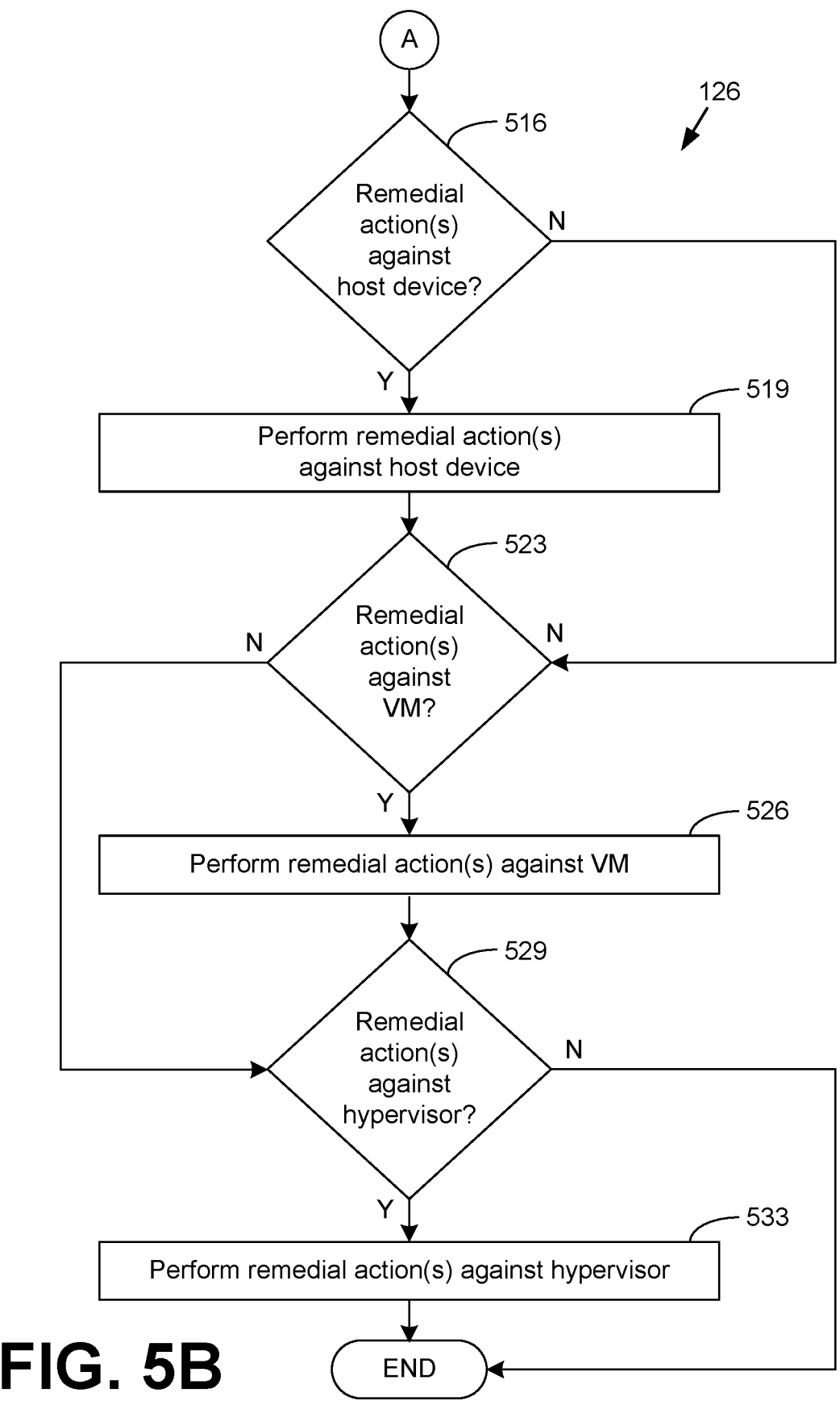

With reference to FIGS. 5A-5B, shown is a flowchart that provides an example of a portion of the operation of the host management component 126. In particular, FIGS. 5A-5B provide an example of the host management component 126 enforcing compliance rules 119.

Beginning with step 503, the host management component 126 can generate a data object specifying conditions of the host device 106. For example, the host management component 126 can determine a list of host applications 129 installed in the host device 106 and the particular type and version of the host operating system 123. The host management component 126 can also identify the location of the host device 106 and the particular LANs to which the host device 106 is connected.

As shown at step 506, the host management component 126 can obtain a data object specifying conditions of the virtual machine 136. For example, the data object for the virtual machine 136 can specify the location of the virtual machine 136, a LAN to which the virtual machine 136 is connected, and a list of guest applications 149 installed in the virtual machine 136.

At step 509, the host management component 126 can determine whether compliance rules 119 associated with the host device 106 or the virtual machine 136 are violated. To this end, the host management component 126 can compare the data objects specifying conditions of the host device 106 and the virtual machine 136 to the compliance rules 119. In other examples, the host management component 126 can request the management service 113 or the guest management component 146 to evaluate the data objects specifying the conditions and provide an indication as to whether compliance rules 119 are violated.

If the host management component 126 determines that a compliance rule 119 is not violated, the process can end. Otherwise, if the host management component 126 determines that a compliance rule 119 is violated, the host management component 126 can proceed to step 513 and determine remedial actions to perform. As described above, a compliance rule 119 can specify the remedial action to be performed in response to a violation of a compliance rule 119. Thus, the host management component 126 can determine the remedial action to perform by parsing the compliance rule 119 that was violated.

As indicated at step 516, which is shown on FIG. 5B, the host management component 126 can determine whether it is to perform a remedial action against the host device 106. For example, the host management component 126 can determine that a violated compliance rule 119 specifies that the host management component should modify a condition of the host device 106 in response to a violation of the compliance rule 119. If the host management component 126 determines to perform a remedial action against the host device 106, the host management component 126 can perform the remedial action at step 519. For example, the host management component 126 can disable a component or a feature in the host device 106. To this end, the host management component 126 can, for example, provide an API call to the host operating system 123 to disable the component or feature in the host device 106.

Thereafter, the host management component 126 can move to step 523. The host management component 126 can also move to step 523 if it determines not to perform a remedial action against the host device 106 at step 516. At step 523, the host management component 126 can determine whether it is to perform a remedial action against the virtual machine 136. For example, a compliance rule 119 can specify that a particular guest application 149 should be disabled in the event of a violation. If so, the host management component 126 can perform the remedial action against the virtual machine 136, as shown at step 526. For example, the host management component 126 can request the hypervisor 139 or the guest management component 146 to disable a component or functionality in the virtual machine 136.

After the host management component performs the remedial action against the virtual machine 136, the host management component 126 can move to step 529. The host management component 126 can also move to step 529 in response to determining that the host management component 126 should not perform a remedial action against the virtual machine 136 at step 523. At step 529, the host management component 126 can determine whether it is to perform a remedial action against the hypervisor 139. For example, a compliance rule 119 can specify that the host management component 126 should cause the hypervisor 139 to disable data sharing between the virtual machine 136 and the host device 106 in response to the compliance rule 119 being violated. If the host management component 126 determines to perform the remedial action against the hypervisor, the host management component 126 can move to step 533 and perform the remedial action. For example, the host management component 126 can provide an API call to the hypervisor 139 to modify a configuration of the hypervisor 139.

Thereafter, the process can end. The process can also end if the host management component 126 determines that the host management component 126 should not perform a remedial action at step 529.

Figure 6:
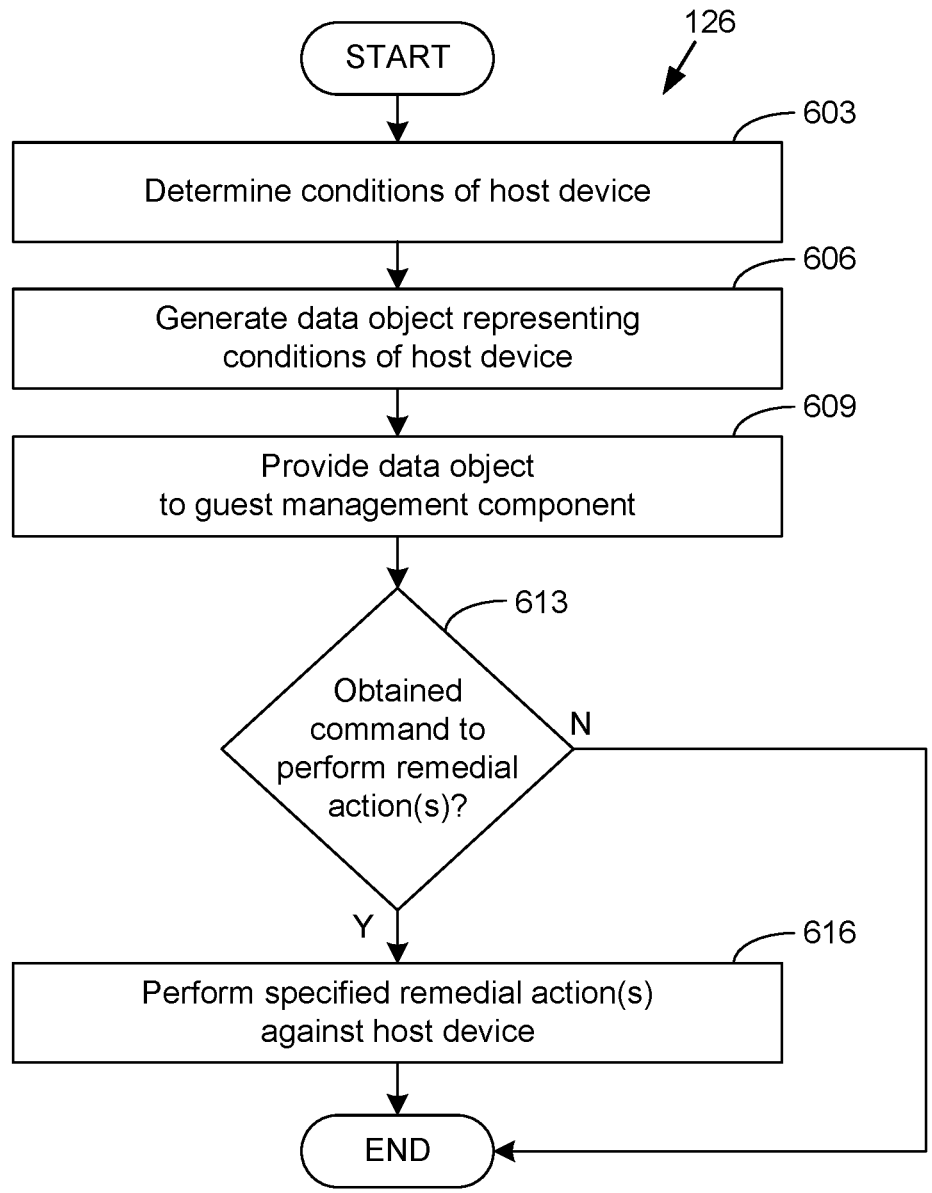
FIG. 6 shows a flowchart illustrating another example of functionality implemented by a host management component.

With reference to FIG. 6, shown is a flowchart that provides another example of a portion of the operation of the host management component 126. In particular, FIG. 6 provides an example of the host management component 126 providing a data object for the host device 106 to the guest management component 146 and performing a remedial action.

Beginning with step 603, the host management component 126 can determine conditions of the host device 106. For example, the host management component 126 can determine a list of host applications 129 installed in the host device 106 and the particular type and version of the host operating system 123. The host management component 126 can also identify the location of the host device 106 and a particular LAN to which the host device 106 is in communication.

As shown at step 606, the host management component 126 can generate a data object for the host device 106. The data object can specify the conditions of the host device 106, as determined at step 603. Then, as indicated at step 609, the host management component 126 can provide the data object for the host device 106 to the guest management component 146. In some examples, the host management component 126 can transfer the data object to the guest management component 146 through the hypervisor 139.

At step 613, the host management component 126 can determine whether it obtained a command to perform a remedial action. The host management component 126 can receive the command from, for example, the guest management component 146. If the host management component 126 did not obtain a command to perform a remedial action, the process can end. Otherwise, if the host management component 126 obtains a command to perform a remedial action, the host management component 126 can proceed to step 616 and perform the specified remedial action against the host device 106. For instance, the host management component 126 can uninstall disable network 109 connectivity for the host device 106 or modify a setting for the hypervisor 139. Thereafter, the process can end.

Figure 7A:
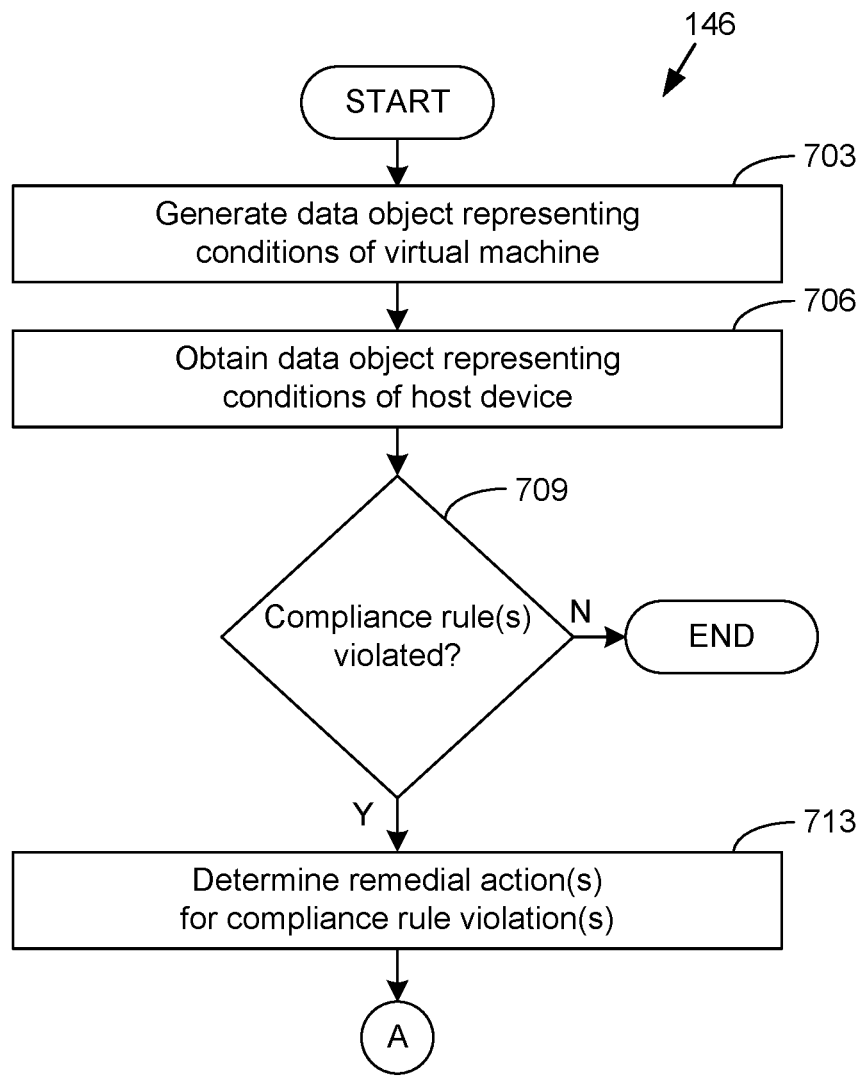
FIGS. 7A-7B show a flowchart illustrating another example of functionality implemented by a guest management component.
Figure 7B:
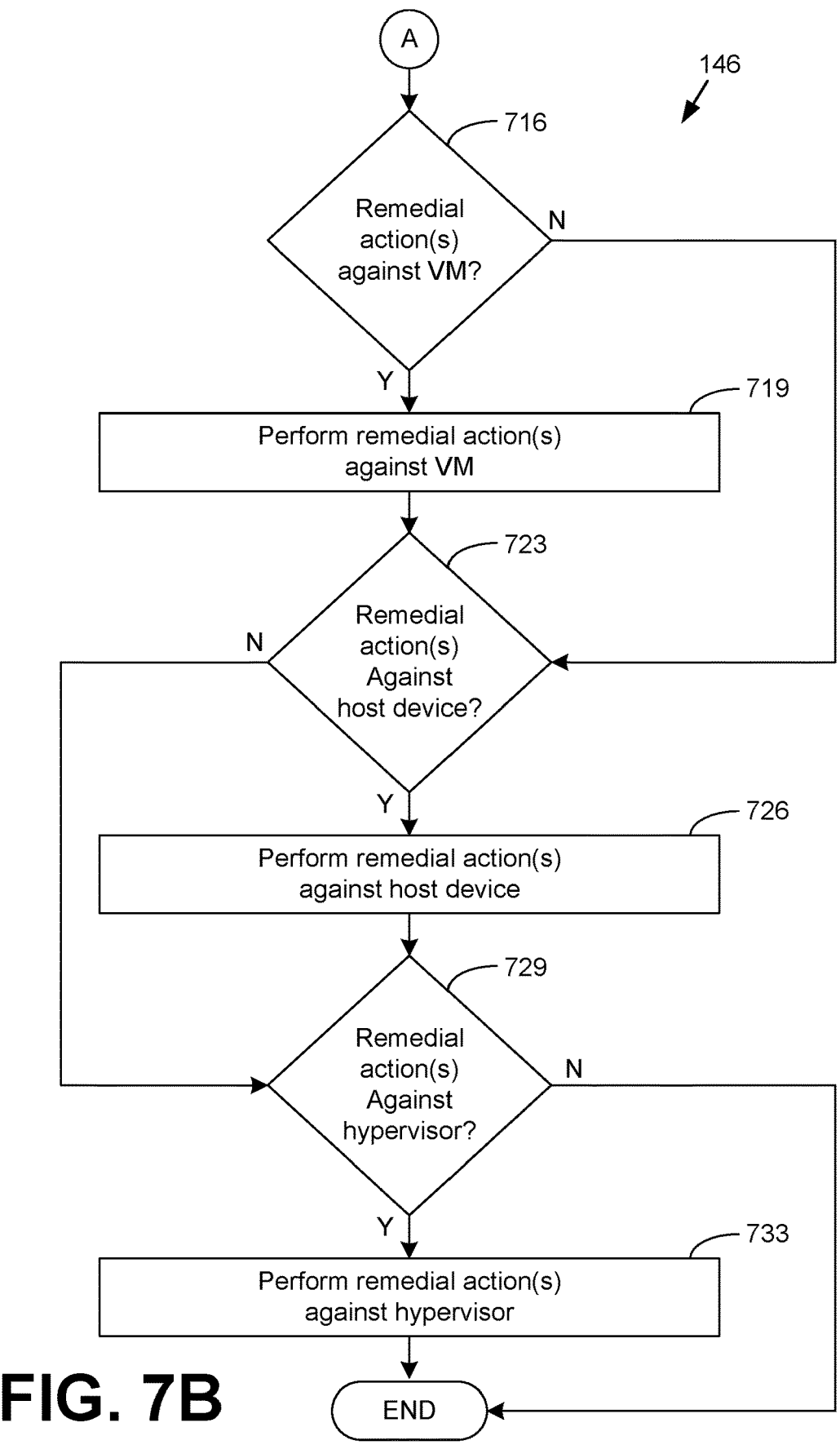

With reference to FIGS. 7A-7B, shown is a flowchart that provides an example of a portion of the operation of the guest management component 146. In particular, FIGS. 7A-7B provide an example of the host management component 126 enforcing compliance rules 119.

Beginning with step 703, the guest management component 146 can generate a data object specifying conditions of the virtual machine 136. For example, the guest management component 146 can determine a list of guest applications 149 installed in the host device 106 and the particular type and version of the guest operating system 143. The guest management component 146 can also identify the location of the virtual machine 136 and the particular LAN to which the virtual machine 136 is in communication.

As shown at step 706, the guest management component 146 can obtain a data object specifying conditions of the host device 106. For example, the data object for the host device 106 can specify the location of the host device 106, a LAN to which the host device 106 is in communication, and a list of host applications 129 installed in the host device 106.

At step 709, the guest management component 146 can determine whether compliance rules 119 assigned to the host device 106 or the virtual machine 136 are violated. To this end, the guest management component 146 can compare the data objects specifying conditions of the host device 106 and the virtual machine 136 to the compliance rules 119. In other examples, the guest management component 146 can request the management service 113 or the host management component 126 to evaluate the data objects specifying the conditions and provide an indication as to whether compliance rules 119 are violated.

If the guest management component 146 determines that a compliance rule 119 is not violated, the process can end. Otherwise, if the host management component 126 determines that a compliance rule 119 is violated, the guest management component 146 can proceed to step 713 and determine remedial actions to perform. As described above, a compliance rule 119 can specify the remedial action to be performed in response to a violation of a compliance rule 119. Thus, the guest management component 146 can determine the remedial action to perform by parsing the compliance rule 119 that was violated.

As indicated at step 716, which is shown on FIG. 7B, the guest management component 146 can determine whether it is to perform a remedial action against the virtual machine 136. For example, the host management component 126 can determine that a violated compliance rule 119 specifies that the guest management component 146 should modify a condition of the virtual machine 136 in response to a violation of the compliance rule 119. If the guest management component 146 determines to perform a remedial action against the virtual machine 136, the guest management component 146 can perform the remedial action at step 719. For example, the guest management component 146 can disable a component or a feature in the virtual machine 136. To this end, the guest management component 146 can, for example, provide an API call to the guest operating system 143 to disable the component or feature in the virtual machine 136.

Thereafter, the guest management component 146 can move to step 723. The guest management component 146 can also move to step 723 if it determines not to perform a remedial action against the virtual machine 136 at step 716. At step 723, the guest management component 146 can determine whether it is to perform a remedial action against the host device 106. For example, a compliance rule 119 can specify that a particular host application 129 should be disabled in the event of a violation. If so, the guest management component 146 can perform the remedial action against the host device 106, as shown at step 726. For example, the guest management component 146 can request the host management component 126 to disable a component or functionality in the host device 106.

After the guest management component 146 performs the remedial action against the host device 106, the guest management component 146 can move to step 729. The guest management component 146 can also move to step 729 in response to determining that the guest management component 146 should not perform a remedial action against the host device 106 at step 723. At step 729, the guest management component 146 can determine whether it is to perform a remedial action against the hypervisor 139. For example, a compliance rule 119 can specify that the guest management component 146 should cause the hypervisor 139 to disable data sharing between the host device 106 and the virtual machine 136 in response to the compliance rule 119 being violated. If the guest management component 146 determines to perform the remedial action against the hypervisor 139, the guest management component 146 can move to step 733 and perform the remedial action. For example, the guest management component 146 can provide an API call to the hypervisor 139 to modify a configuration of the hypervisor 139.

Thereafter, the process can end. The process can also end if the guest management component 146 determines that the guest management component 146 should not perform a remedial action at step 729.

The sequence diagrams and flowcharts discussed above show examples of the functionality and operation of implementations of components described herein. The components of the networked environment 100 described herein can be embodied in hardware, software, or a combination of hardware and software. If embodied in software, each step in the sequence diagrams and flowcharts can represent a module or a portion of code that includes computer instructions to implement the specified logical functions. The computer instructions can include source code that comprises human-readable statements written in a programming language or machine code that comprises machine instructions recognizable by a suitable execution system, such as a processor in a computer system. If embodied in hardware, each step can represent a circuit or a number of interconnected circuits that implement the specified logical functions.

Although the sequence diagrams and flowcharts discussed above show a specific order of execution, the order of execution can differ from that which is shown. For example, the order of execution of two or more steps can be switched relative to the order shown. Also, two or more steps shown in succession can be executed concurrently or with partial concurrence. Further, in some examples, one or more of the steps shown in the flowcharts can be skipped or omitted. In addition, any number of counters, state variables, warning semaphores, or messages can be added to the logical flow described herein, for purposes of enhanced utility, accounting, performance measurement, or troubleshooting aid.

The enterprise computing environment 103 and host device 106 can include at least one processing circuit. Such a processing circuit can include one or more processors and one or more storage devices that are coupled to a local interface. The local interface can include a data bus with an accompanying address/control bus.

A storage device for a processing circuit can store data and components that are executable by the one or more processors of the processing circuit. In some examples, at least portions of the management service 113, the host operating system 123, the host management component 126, the host application 129, and the hypervisor 139 can be stored in one or more storage devices and be executable by one or more processors. Also, the enterprise data store 116 can be located in the one or more storage devices.

Components described herein can be embodied in the form of hardware, as software components that are executable by hardware, or as a combination of software and hardware. If embodied as hardware, the components described herein can be implemented as a circuit or state machine that employs any suitable hardware technology. Such hardware technology includes, for example, microprocessors, discrete logic circuits having logic gates for implementing various logic functions upon an application of one or more data signals, application specific integrated circuits (ASICs) having appropriate logic gates, or programmable logic devices, such as field-programmable gate array (FPGAs) and complex programmable logic devices (CPLDs).

Also, one or more or more of the components described herein that include software or computer instructions can be embodied in any non-transitory computer-readable medium for use by or in connection with an instruction execution system such as, for example, a processor in a computer system or other system. Such a computer-readable medium can contain, store, and maintain the software and computer instructions for use by or in connection with the instruction execution system.

A computer-readable medium can comprise a physical media, such as, magnetic, optical, semiconductor, or other suitable media. Examples of a suitable computer-readable media include solid-state drives, magnetic drives, flash memory, and storage discs, such as compact discs (CDs). Further, any logic or component described herein can be implemented and structured in a variety of ways. For example, one or more components described can be implemented as modules or components of a single application. Further, one or more components described herein can be executed in one computing device or by using multiple computing devices.

The examples described above are merely examples of implementations to set forth for a clear understanding of the principles of the disclosure. Many variations and modifications can be made to the examples described above without departing substantially from the spirit and principles of the disclosure. All such modifications and variations are intended to be included herein within the scope of this disclosure.

Therefore, the following is claimed:

1. A method, comprising:
receiving, by a guest management component executed within a guest virtual machine executed by a host device, at least one compliance rule from a management service;
receiving, by the guest management component from a hypervisor component, a host environment data object generated by a host management component executed in the host device, the host environment data object specifying host parameters detected for the host device and hypervisor parameters detected for the hypervisor component of the host device, wherein the hypervisor component relays the host environment data object from the host management component to the guest management component, wherein the host environment data object indicates an enrollment status of at least one of the hypervisor component or the host management component;
determining, by the guest management component, a violation of the at least one compliance rule identified based on at least one of the host parameters and the hypervisor parameters; and
performing, by the guest management component, an action based on the violation of the at least one compliance rule.

2. The method of claim 1, wherein the action comprises transmitting an application programming interface (API) call from the guest management component to at least one of: the hypervisor component, the host component, and a host operating system of the host device.

3. The method of claim 1, wherein the host environment data object further indicates at least one of: an operating system version, a list of stored files, a list of installed applications, a basic input output system (BIOS) type, and a unified extensible firmware interface (UEFI) version.

4. The method of claim 1, wherein the action comprises initiating enrollment, with the management service, of at least one of the host management component and the hypervisor component with the management service.

5. The method of claim 1, wherein the action performed by the guest management component comprises unenrollment, from the management service, of at least one of the host management component and the hypervisor component.

6. The method of claim 1, further comprising:
transmitting, by the guest management component, a notification of the violation to at least one of: a user of the host device, and an administrator of an enterprise computing environment comprising the host device.

7. The method of claim 1, wherein the action comprises instructing the hypervisor component to disable data sharing between the host device and the virtual machine.

8. A system, comprising:
a host device comprising at least one processor;
at least one hardware storage device storing instructions executable by the at least one processor, wherein the instructions, when executed by the at least one processor, cause the host device to at least cause the host device to at least:
receive, by a guest management component executed within a guest virtual machine executed by the host device, at least one compliance rule from a management service;
receive, by the guest management component from a hypervisor component, a host environment data object generated by a host management component executed in the host device, the host environment data object specifying host parameters detected for the host device and hypervisor parameters detected for the hypervisor component of the host device, wherein the hypervisor component relays the host environment data object from the host management component to the guest management component;
determine, by the guest management component, a violation of the at least one compliance rule identified based on at least one of the host parameters and the hypervisor parameters; and
perform, by the guest management component, an action based on the violation of the at least one compliance rule, wherein the action comprises causing enrollment, with the management service, of at least one of the host management component and the hypervisor component with the management service.

9. The system of claim 8, wherein the action comprises transmitting an application programming interface (API) call from the guest management component to at least one of: the hypervisor component, the host component, and a host operating system of the host device.

10. The system of claim 8, wherein the host environment data object indicates an enrollment status of at least one of the hypervisor component or the host management component.

11. The system of claim 8, wherein the host environment data object indicates at least one of: an operating system version, a list of stored files, a list of installed applications, a basic input output system (BIOS) type, and a unified extensible firmware interface (UEFI) version.

12. The system of claim 8, wherein the action performed by the guest management component further comprises unenrollment, from the management service, of the at least one of the host management component and the hypervisor component.

13. The system of claim 8, wherein the instructions, when executed by the at least one processor, cause the host device to at least:
transmit, by the guest management component, a notification of the violation to at least one of: a user of the host device, and an administrator of an enterprise computing environment comprising the host device.

14. The system of claim 8, wherein the action comprises instructing the hypervisor component to disable data sharing between the host device and the virtual machine.

15. A non-transitory computer-readable medium storing instructions, wherein the instructions, when executed by at least one processor, cause a host device to at least:
receive, by a guest management component executed within a guest virtual machine executed by the host device, at least one compliance rule from a management service;
receive, by the guest management component from a hypervisor component, a host environment data object generated by a host management component executed in the host device, the host environment data object specifying host parameters detected for the host device and hypervisor parameters detected for the hypervisor component of the host device, wherein the hypervisor component relays the host environment data object from the host management component to the guest management component;
determine, by the guest management component, a violation of the at least one compliance rule identified based on at least one of the host parameters and the hypervisor parameters; and
perform, by the guest management component, an action based on the violation of the at least one compliance rule, wherein the action performed by the guest management component comprises unenrollment, from the management service, of at least one of the host management component and the hypervisor component.

16. The non-transitory computer-readable medium of claim 15, wherein the action performed by the guest management component comprises transmitting an application programming interface (API) call from the guest management component to at least one of: the hypervisor component, the host component, and a host operating system of the host device.

17. The non-transitory computer-readable medium of claim 15, wherein the host environment data object indicates an enrollment status of at least one of the hypervisor component or the host management component.

18. The non-transitory computer-readable medium of claim 15, wherein the action performed by the guest management component further comprises enrollment, with the management service, of the at least one of the host management component and the hypervisor component with the management service.

19. The non-transitory computer-readable medium of claim 15, wherein the host environment data object indicates at least one of: an operating system version, a list of stored files, a list of installed applications, a basic input output system (BIOS) type, and a unified extensible firmware interface (UEFI) version.

20. The non-transitory computer-readable medium of claim 15, wherein the action performed by the guest management component further comprises instructing the hypervisor component to disable data sharing between the host device and the virtual machine.

\* \* \* \* \*